United States Patent
Oberle et al.

(10) Patent No.: US 9,171,060 B2
(45) Date of Patent: Oct. 27, 2015

(54) ADJUSTABLE TRANSFORMATIONS FROM SEMANTIC WEB LANGUAGES

(71) Applicants: Daniel Oberle, Durmersheim (DE); Martin Knauer, Karlsruhe (DE); Tirdad Rahmani, Karlsruhe (DE)

(72) Inventors: Daniel Oberle, Durmersheim (DE); Martin Knauer, Karlsruhe (DE); Tirdad Rahmani, Karlsruhe (DE)

(73) Assignee: SAP SE, Walldorf (DE)

( * ) Notice: Subject to any disclaimer, the term of this patent is extended or adjusted under 35 U.S.C. 154(b) by 260 days.

(21) Appl. No.: 13/834,287

(22) Filed: Mar. 15, 2013

(65) Prior Publication Data

US 2014/0280370 A1    Sep. 18, 2014

(51) Int. Cl.
G06F 7/00 (2006.01)
G06F 17/30 (2006.01)
G06F 9/44 (2006.01)
G06F 9/45 (2006.01)

(52) U.S. Cl.
CPC ............ *G06F 17/30607* (2013.01); *G06F 8/10* (2013.01); *G06F 8/51* (2013.01); *G06F 17/30038* (2013.01)

(58) Field of Classification Search
None
See application file for complete search history.

(56) References Cited

U.S. PATENT DOCUMENTS

| | | | |
|---|---|---|---|
| 8,065,655 B1 * | 11/2011 | Deo et al. | 717/106 |
| 2007/0271277 A1 * | 11/2007 | Ivan et al. | 707/100 |
| 2010/0275179 A1 * | 10/2010 | Mengusoglu et al. | 717/104 |
| 2012/0197832 A1 * | 8/2012 | Shanmukh et al. | 706/46 |

OTHER PUBLICATIONS

Rahmani et al., "An Adjustable Transformation from OWL to Ecore", 13th International Conference, MODELS 2010 Oslo, Norway, Oct. 3-8, 2010, Proceedings, Part II. Published in Model Driven Engineering Languages and Systems. Springer Berlin Heidelberg, 2010. pp. 243-257.*
Pan, Yue, et al. "Model-driven ontology engineering." Journal on Data Semantics VII. Springer Berlin Heidelberg, 2006. 57-78.*
Gronmo et al., "Transofmrations Between UML and OWL-S", ECMDA-FA 2005, LNCS 3748, pp. 269-283, 2005. Springer-Verlag Berlin Heidelberg 2005. Published 2005.*
Duric, "MDA-based Ontology Infrastructure", Computer Science and Inforamtion Systems, vol. 1, No. 1, pp. 91-116, Feb. 2004.*

* cited by examiner

*Primary Examiner* — Augustine K Obisesan
*Assistant Examiner* — David T Brooks
(74) *Attorney, Agent, or Firm* — Schwegman Lundberg & Woessner, P.A.

(57) ABSTRACT

Methods and systems of transforming ontologies of semantic web languages are disclosed. A user may adjust configuration settings for a transformation of primitives of a Semantic Web ontology language into primitives of a software modeling language. The adjusted configuration settings may be stored on a storage device. The transformation of primitives of the Semantic Web ontology language into primitives of the software modeling language may be performed using the adjusted configuration settings stored on the storage device. The adjusted configuration settings stored on the storage device may be selected for use in a subsequent transformation of primitives of the Semantic Web ontology language into primitives of the software modeling language. In some embodiments, the semantic web language is Resource Description Framework Schema (RDFS). In some embodiments, the software modeling language is Ecore.

20 Claims, 27 Drawing Sheets

1700

- com.sap.owl2ecore
  - config
  - ecore
  - owl
  - util
  - BadConfigException.java
  - ConfigManager.java
  - OmittedClassException.java
  - OWL2EcoreGlobals.java
  - OWL2EcoreMain.java
  - OWL2EcoreTransformation.java
  - ReasonerFactory.java
  - UntransformableConceptException.java

- config
  - impl
  - util
  - CardinalityType.java
  - Config.java
  - ConfigDocumentRoot.java
  - ConfigFactory.java
  - ConfigPackage.java
  - CustomPushDownType.java
  - DataProperty.java
  - DocumentRootType.java
  - Entity.java
  - ImportDepthType.java
  - Individual.java
  - LocationOfHelperClassesType.java
  - NamedEntity.java
  - Namespace.java
  - NamespaceTransformationType.java
  - ObjectProperty.java
  - OClass.java
  - Property.java
  - PushDownType.java
  - SubPropertyRelation.java

FIG. 18

ADJUSTABLE TRANSFORMATIONS FROM SEMANTIC WEB LANGUAGES

TECHNICAL FIELD

The present application relates generally to the technical field of data processing, and, in various embodiments, to methods and systems of transforming ontologies of Semantic Web languages.

BACKGROUND

The Semantic Web is an effort led by the World Wide Web Consortium (W3C) aiming to allow the exchange and reuse of data by formalizing the meaning of information. As a classic means of knowledge representation, ontologies play a vital role in this effort. The Resource Description Framework (RDF) and RDF Schema (RDFS) are the W3C recommendations for ontology definition. They are increasingly being used to define ontologies which serve as reference models in a specific domain (e.g., the ISO 15926 Oil & Gas ontology).

Currently, the majority of conventional software engineers typically neither have knowledge in Semantic Web languages such as RDFS, nor do they have the time for familiarizing themselves with the new technology. Yet, at the same time, Semantic Web languages are increasingly being used for specifying reference models on which software has to be built. Therefore, conventional software developers are prompted to build software on the basis of such ontologies.

BRIEF DESCRIPTION OF THE DRAWINGS

Some embodiments of the present disclosure are illustrated by way of example and not limitation in the figures of the accompanying drawings, in which like reference numbers indicate similar elements, and in which:

FIG. 17 illustrates a package structure of an implementation, in accordance with an example embodiment;

FIG. 18 illustrates the composition of a config package, in accordance with an example embodiment;

DETAILED DESCRIPTION

Figure 1:
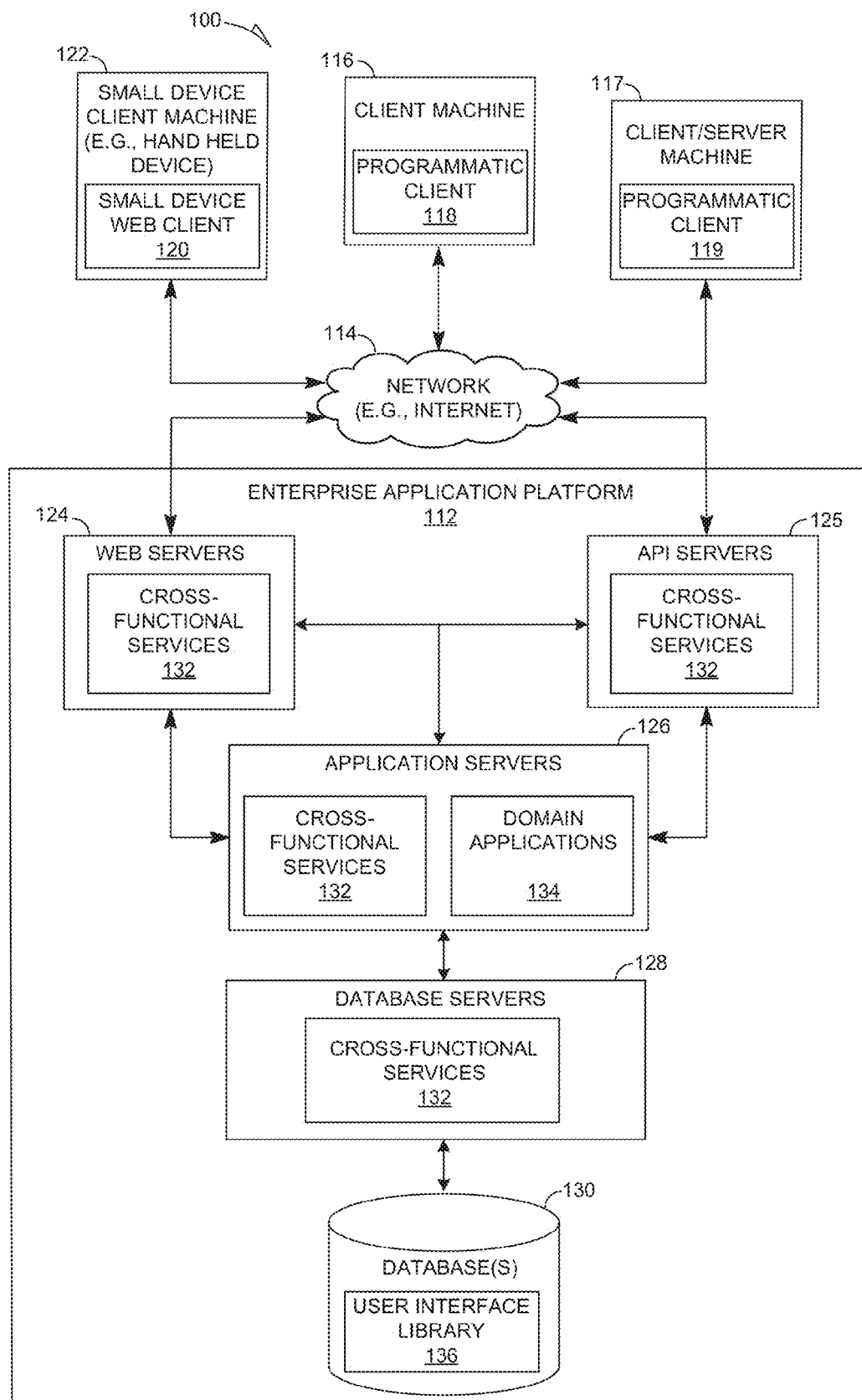
FIG. 1 is a network diagram illustrating a client-server system, in accordance with an example embodiment.

Example methods and systems of transforming ontologies of semantic web languages are described. In the following description, for purposes of explanation, numerous specific details are set forth in order to provide a thorough understanding of example embodiments. It will be evident, however, to one skilled in the art that the present embodiments may be practiced without these specific details.

In the present disclosure, a solution is provided that may allow for the incorporation of RDFS ontologies into the familiar environment of conventional software engineers. Thus, software developers are relieved from learning the specifics of ontology languages and are enabled to build software on the ontology at the same time. More specifically, the solution may provide a flexible transformation from RDFS to Ecore. Ecore is the UML "dialect" of the wide-spread software engineering environment Eclipse. UML is a wide-spread software engineering modeling language. The transformation may seamlessly incorporate and import a given RDFS ontology into Eclipse. A wizard may guide the developer through alternative ways of importing a given ontology and adjusting configuration settings for the transformation.

In some embodiments, a computer-implemented method may comprising enabling a user to adjust configuration settings for a transformation of primitives of a Semantic Web ontology language into primitives of a software modeling language, storing the adjusted configuration settings on a storage device, performing, by a machine, the transformation of primitives of the Semantic Web ontology language into primitives of the software modeling language using the adjusted configuration settings stored on the storage device, and enabling a selection of the adjusted configuration settings stored on the storage device for use in a subsequent transformation of primitives of the Semantic Web ontology language into primitives of the software modeling language.

In some embodiments, performing the transformation may comprise generating Object Constraint Language (OCL) constraints for primitives of the software modeling language. In some embodiments, the semantic web language is Resource Description Framework Schema (RDFS). In some embodiments, the semantic web language is Web Ontology Language (OWL). In some embodiments, the software modeling language is Ecore. In some embodiments, the primitives of the Semantic Web language comprise classes, properties, individuals, and resources. In some embodiments, the method may further comprise enabling the user or another user to adjust the adjusted configuration settings for use in the subsequent transformation of primitives of the Semantic Web ontology language into primitives of the software modeling language.

In some embodiments, a system may comprise a machine having at least one processor, and an ontology transformation module on the machine. The ontology transformation module may be configured to enable a user to adjust configuration settings for a transformation of primitives of a Semantic Web ontology language into primitives of a software modeling language, store the adjusted configuration settings on a storage device, perform the transformation of primitives of the Semantic Web ontology language into primitives of the software modeling language using the adjusted configuration settings stored on the storage device, and enable a selection of the adjusted configuration settings stored on the storage device for use in a subsequent transformation of primitives of the Semantic Web language into primitives of the software modeling language.

In some embodiments, the ontology transformation module is further configured to generate Object Constraint Language (OCL) constraints for primitives of the software modeling language. In some embodiments, the semantic web language is Resource Description Framework Schema (RDFS). In some embodiments, the semantic web language is Web Ontology Language (OWL). In some embodiments, the software modeling language is Ecore. In some embodiments, the primitives of the Semantic Web language comprise classes, properties, individuals, and resources. In some embodiments, the ontology transformation module may be further configured to enable the user or another user to adjust the adjusted configuration settings for use in the subsequent transformation of primitives of the Semantic Web ontology language into primitives of the software modeling language.

In some embodiments, a non-transitory machine-readable storage device may store a set of instructions that, when executed by at least one processor, causes the at least one processor to perform the operations and method steps discussed within the present disclosure.

FIG. 1 is a network diagram illustrating a client-server system, in accordance with an example embodiment. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser, such as the INTERNET EXPLORER browser developed by Microsoft Corporation of Redmond, Wash. State), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 may be coupled to, and provide web and programmatic interfaces to, application servers 126. The application servers 126 may be, in turn, coupled to one or more database servers 128 that facilitate access to one or more databases 130. The web servers 124, Application Program Interface (API) servers 125, application servers 126, and database servers 128 may host cross-functional services 132. The application servers 126 may further host domain applications 134.

The cross-functional services 132 provide services to users and processes that utilize the enterprise application platform 112. For instance, the cross-functional services 132 may provide portal services (e.g., web services), database services and connectivity to the domain applications 134 for users that operate the client machine 116, the client/server machine 117 and the small device client machine 122. In addition, the cross-functional services 132 may provide an environment for delivering enhancements to existing applications and for integrating third-party and legacy applications with existing cross-functional services 132 and domain applications 134. Further, while the system 100 shown in FIG. 1 employs a client-server architecture, the embodiments of the present invention are of course not limited to such an architecture, and could equally well find application in a distributed, or peer-to-peer, architecture system.

Figure 2:
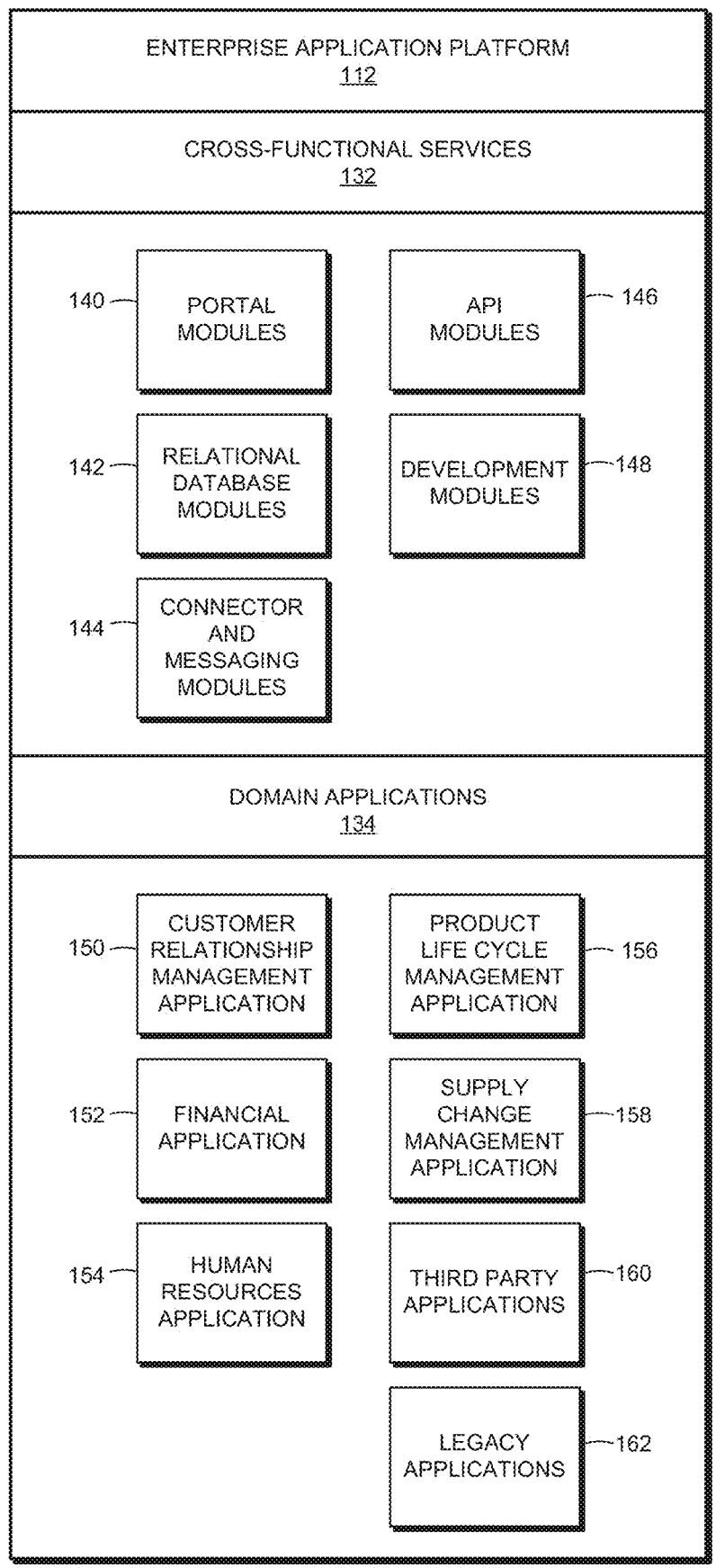
FIG. 2 is a block diagram illustrating enterprise applications and services in an enterprise application platform, in accordance with an example embodiment.

FIG. 2 is a block diagram illustrating enterprise applications and services in an enterprise application platform 112, in accordance with an example embodiment. The enterprise application platform 112 includes cross-functional services 132 and domain applications 134. The cross-functional services 132 may include portal modules 140, relational database modules 142, connector and messaging modules 144, Application Program Interface (API) modules 146, and development modules 148.

The portal modules 140 may enable a single point of access to other cross-functional services 132 and domain applications 134 for the client machine 116, the small device client machine 122 and the client/server machine 117. The portal modules 140 may be utilized to process, author and maintain web pages that present content (e.g., user interface elements and navigational controls) to the user. In addition, the portal modules 140 may enable user roles, a construct that associates a role with a specialized environment that is utilized by a user to execute tasks, utilize services and exchange information with other users and within a defined scope. For example, the role may determine the content that is available to the user and the activities that the user may perform. The portal modules 140 include a generation module, a communication module, a receiving module and a regenerating module. In addition the portal modules 140 may comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 142 may provide support services for access to the database(s) 130, which includes a user interface library 136. The relational database modules 142 may provide support for object relational mapping, database independence and distributed computing. The relational database modules 142 may be utilized to add, delete, update and manage database elements. In addition, the relational database modules 142 may comply with database standards and/or utilize a variety of database technologies including SQL, SQLDBC, Oracle, MySQL, Unicode, JDBC.

The connector and messaging modules 144 may enable communication across different types of messaging systems that are utilized by the cross-functional services 132 and the domain applications 134 by providing a common messaging application processing interface. The connector and messaging modules 144 may enable asynchronous communication on the enterprise application platform 112.

The Application Program Interface (API) modules 146 may enable the development of service-based applications by exposing an interface to existing and new applications as services. Repositories may be included in the platform as a central place to find available services when building applications.

The development modules 148 may provide a development environment for the addition, integration, updating and extension of software components on the enterprise application platform 112 without impacting existing cross-functional services 132 and domain applications 134.

Turning to the domain applications 134, the customer relationship management application 150 may enable access to and may facilitate collecting and storing of relevant personalized information from multiple data sources and business processes. Enterprise personnel that are tasked with developing a buyer into a long-term customer may utilize the customer relationship management applications 150 to provide assistance to the buyer throughout a customer engagement cycle.

Enterprise personnel may utilize the financial applications 152 and business processes to track and control financial transactions within the enterprise application platform 112. The financial applications 152 may facilitate the execution of operational, analytical and collaborative tasks that are associated with financial management. Specifically, the financial applications 152 may enable the performance of tasks related to financial accountability, planning, forecasting, and managing the cost of finance.

The human resource applications 154 may be utilized by enterprise personnel and business processes to manage, deploy, and track enterprise personnel. Specifically, the human resource applications 154 may enable the analysis of human resource issues and facilitate human resource decisions based on real time information.

The product life cycle management applications 156 may enable the management of a product throughout the life cycle of the product. For example, the product life cycle management applications 156 may enable collaborative engineering, custom product development, project management, asset management and quality management among business partners.

The supply chain management applications 158 may enable monitoring of performances that are observed in supply chains. The supply chain management applications 158 may facilitate adherence to production plans and on-time delivery of products and services.

The third-party applications 160, as well as legacy applications 162, may be integrated with domain applications 134 and utilize cross-functional services 132 on the enterprise application platform 112.

The Resource Description Framework (RDF) is a formal language for describing structured information. It allows making statements about resources in regards to their relation to other resources with the intention to allow further processing and re-combination of the information represented by these resources, which may be done in the form of a directed multi-graph, where vertices and edges are labeled with identifiers (RDF may use uniform resource idendifiers (URIs) or internationalized resource identifiers (IRIs) as identifiers).

An RDF graph may be described by the collection of its edges, where the edge is given in the form of a triple: a subject-predicate-object expression, where the predicate represents the edge and hence the relation between the vertices, i.e., subject and object. RDF graphs can thus be serialized as a collection of all their triples. With N3, N-Triples and Turtle, several syntaxes exist that allow serialization of RDF in triple form. However, due to well established tool and programming library support for XML, the main syntax for RDF is the XML-based serialization RDF/XML.

With RDF, individuals can be specified and set into relation to each other:
 ex:martin ex:isWriting ex:aDiplomaThesis.
Individuals can be set into relation with data values (also called literals), and it is possible to assign types to literals:

ex:aDiplomaThesis ex:hasTitle "Semantic Web to Ecore" .
 ex:aDiplomaThesis ex:dueDate "2011-12-31"^^xsd:date .

Assigning a type to literals allows for proper interpretation by software applications processing RDF documents. Types can also be assigned to resources:
 ex:martin rdf:type ex:Student.
Assigning a type to resources signalizes that these entities share common traits and marks these entities as elements of a certain aggregation. This aggregation may be called a class. Typically, the resources which are used as predicates in triples express a relationship between individuals, classes or literals.

It seems inappropriate to consider these resources as individuals or classes. RDF provides the class name rdf:Property for the class of all relations, i.e., properties.

ex:hasTitle rdf:type rdf:property.

With these primitives, it is possible to express factual knowledge, or assertional knowledge, about individuals, but it is not possible to express more generic knowledge. With RDF, we cannot state that, e.g., if someone writes a master thesis, then that person is a student. This kind of knowledge is often called terminological knowledge or schema knowledge. RDF Schema (RDFS) was introduced by the W3C as a solution to this problem. It extends the RDF vocabulary with basic elements for terminological knowledge representation and ontology authoring. This vocabulary is generic and not bound to a specific application area. Its pre-defined semantics (in form of axiomatic rules) allow specifying the semantics of user-defined vocabularies.

RDFS provides common class names for the classes which were implicit in RDF, e.g., rdfs:Class for the class of all classes, rdfs:Resource for the class of all Resources, etc. Also, several pre-defined properties were introduced to allow for subclassing, declaring subproperties, and/or restricting property values to a certain domain and range. For instance, the fact that any Student is also a person can be expressed like this:

ex:Student rdfs:subClassOf ex:Person.

A similar relationship to the subclass relationship exists also for properties:

ex:isHappilyMarriedTo rdfs:subPropertyOf ex:isMarriedTo.

The above triple states, that every individual who is happily married to another individual is also just married to another individual. So by stating ex:martin ex:isHappilyMarriedTo ex:laure, we can deduce that ex:martin ex:isMarriedTo ex:laure is also a valid statement.

If we would want to express that every individual who is married to another individual must implicitly be a person, we can make use of the RDFS vocabulary rdfs:domain and rdfs:range:

---
ex:isMarriedTo rdfs:domain ex:Person .
ex:isMarriedTo rdfs:range ex:Person .
---

This point often leads to confusion among ontology novices, as the above statements do not prevent linking individuals by the property ex:isMarriedTo who aren't persons, but rather implicitly declare these individuals as persons if set into relation via ex:isMarriedTo. This is intuitively opposed to the type-checking notion of nowadays software programming languages.

With RDF(S), it is possible to model simple ontologies and to derive implicit knowledge. However, its expressivity is limited and complex knowledge can often not be represented by RDF(S). To address this problem, the W3C introduced the Web Ontology Language (OWL). Like other languages that allow the modeling of complex knowledge, OWL is based on formal logic and, hence, supports logic reasoning. To address the computational complexities inherent to logic reasoning on complex knowledge, three sublanguages (or species) of OWL were designed: OWL Full, OWL DL and OWL Lite.

OWL Full is the most expressive sublanguage. It contains OWL DL and OWL Lite, as well as all of RDF(S). Because of its undecidability, few software tools are able to handle OWL Full.

OWL DL is based on description logic and is hence decidable. It is widely supported by software tools; several reasoners are available for OWL DL, such as Pellet, HermiT, FaCT++ or TrOWL. In OWL DL, the use of RDF(S) language constructs is restricted. For instance, rdfs:Class and rdf:property are not allowed. Also, it must be clearly distinguished between classes, instances and the different types of properties (see below).

OWL Lite is the least expressive and is contained by OWL Full and OWL DL. Evidently, even more restrictions have to be respected in comparison to OWL Full and OWL DL.

In addition to the syntaxes known from RDF(S), the W3C specified the XML presentation syntax for OWL, which is adapted to the OWL language constructs and provides better readability and less overhead over the much more generic RDF/XML syntax while maintaining the compatibility advantages of XML. RDF/XML is the only normative syntax.

As noted above, OWL Full contains all of RDF(S). The higher expressive power of OWL over RDF(S) is achieved by the addition of new vocabulary with pre-defined semantics. OWL provides its own vocabulary for class and property definition.

Classes can be defined by using owl:Class, as an enumeration of their instances and as combinations of other classes, viz. as the union, the intersection and the complement of another class. The latter definition is based on formal logic constructs and also called complex class definition. Further complex class definitions involve property restrictions and are derived from, e.g., the universal quantifier, the existential quantifier and cardinalities.

For properties, two pre-defined classes exist: Properties of type owl:ObjectProperty connect individuals with individuals, while properties of type owl:DatatypeProperty connect individuals with data values, i.e., with elements of datatypes.

OWL allows specifying certain characteristics of properties. This includes domain and range like in RDF(S), but also includes characteristics like transitivity, symmetry, functionality and inverse functionality. OWL provides certain classes with special semantics; owl:Thing is the class of all instances and as such the superclass of all classes, while owl:Nothing is the empty class, i.e., it contains no instances. It is the subclass of all classes. If classes are inferred to be equivalent to this class, they are denoted to be "unsatisfiable", which indicates an erroneous contradiction in the ontology.

OWL was subsequently extended by the specification of OWL 2, which introduced new modeling primitives as well as so-called profiles OWL 2 EL, OWL 2 QL, and OWL 2 RL, which allow for an even more fine-grained trade-off between complexity and expressivity.

Furthermore, the W3C introduced the functional-style syntax for the definition of OWL 2 in the W3C specification documents. This functional-style syntax uses a prefix notation and is given as a formal grammar. Because of this, it is considered to be a clean, easily readable as well as easily parsable syntax. The only normative syntax is still RDF/XML.

Model-Driven Engineering (MDE) refers to software engineering techniques that use software models as primary engineering artifacts. Below, we highlight relevant key technologies of MDE.

The Meta Object Facility (MOF) is a standard for model-driven engineering issued by the Object Management Group (OMG). It is, at its core, an architecture for meta-metamodels, which originated in the OMG's need for a closed metamodel for UML's class modeling concepts. In addition, the MOF specification and its associated standards contain facilities for model processing, notably the XML Metadata Interchange (XMI) standard, which is commonly used as an interchange format for MOF-related models like UML models. Thus, MOF can be viewed as standard for building metamodels. It acts as a bridge between different metamodels, so that models based on MOF-compliant metamodels can share processing facilities (e.g., model transformation) or storage facilities like model repositories.

Figure 3:
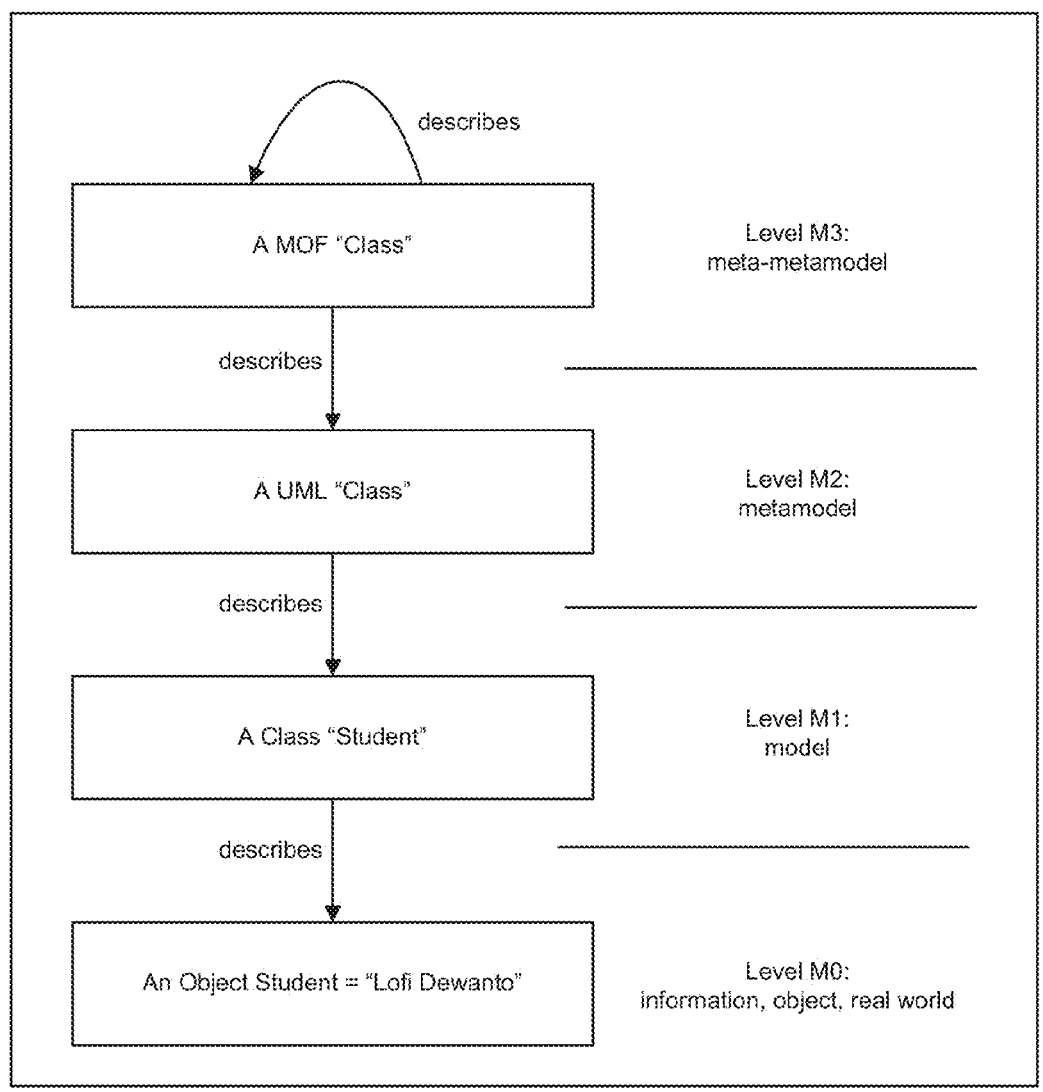
FIG. 3 illustrates a four layer architecture of MOF, in accordance with an example embodiment.
Figure 4:
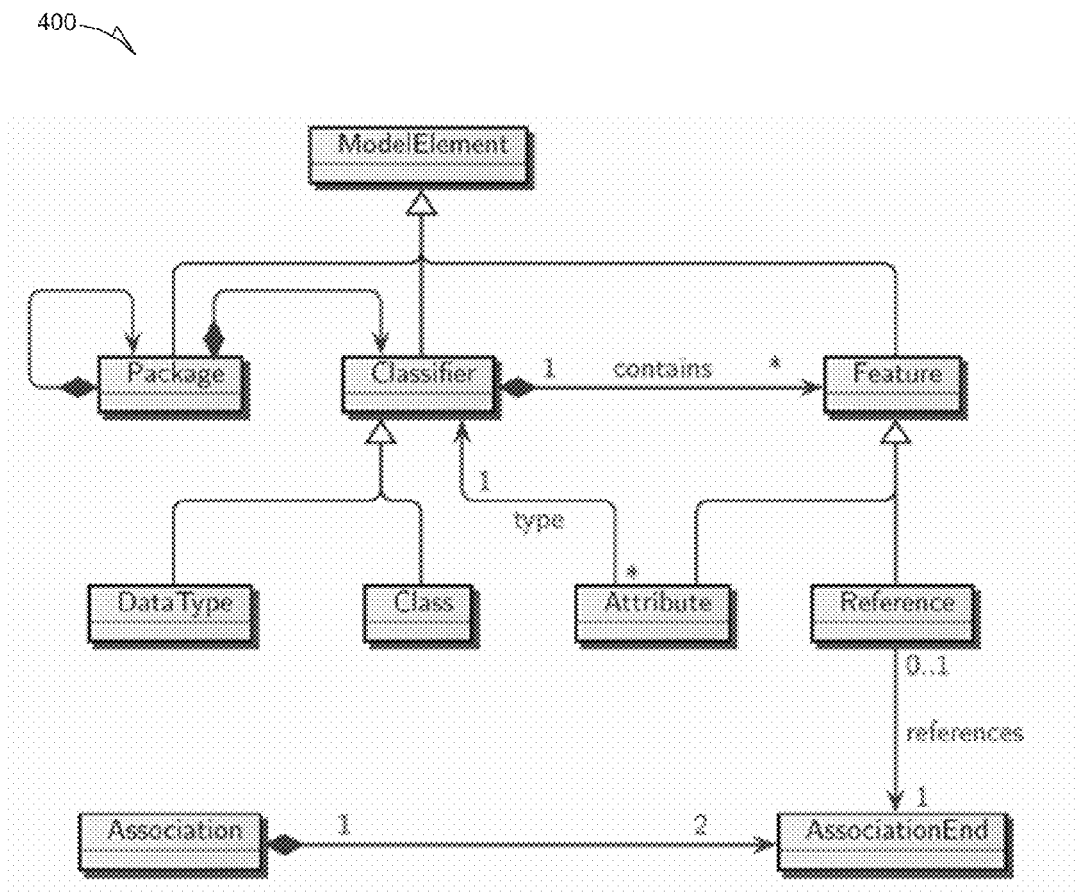
FIG. 4 illustrates a simplified view of the MOF metamodel, in accordance with an example embodiment.

MOF is designed as a four layer architecture. FIG. 3 illustrates a four layer architecture 300 of MOF, in accordance with an example embodiment. Every layer represents another level of abstraction, with a meta-metamodel at the top, the M3 layer. The metametamodel on layer M3 is also called MOF metamodel. FIG. 4 illustrates a simplified view of the MOF metamodel 400, in accordance with an example embodiment. This layer is used to define the metamodels on layer M2, as well as the meta metamodel on layer M3 itself. Layer M2 is the layer for metamodels such as UML or BPMN. It is the definition of how models of layer M1 are specified. M1 is also called the model layer. It represents realizations of one or more metamodels and comprises concrete physical or logical models, such as an UML class diagram of an application, and describes the format and semantics of data. The bottom layer, called data layer or M0 layer, contains the actual data, i.e., objects or instances.

MOF is a closed, strict meta-modeling architecture: closed, because its meta-metamodel (M3 layer) conforms to itself; strict, because every model element on every layer is strictly an instance of a model element of the layer above.

MOF uses classes in the sense of object-oriented programming to define model elements which are used to describe metamodels of common modeling languages, such as UML. A subset of those elements is also known as Essential MOF (EMOF, as opposed to CMOF or Complete MOF). The Eclipse Modeling Framework (EMF) has specified a metamodel called Ecore, which is virtually compatible to EMOF.

The Eclipse Modeling Framework (EMF) is an open source framework based on the Eclipse Platform with the purpose of code generation with the help of structured data models. By default, the generated code is Java code. The generated Java application is able to create instances of the given data model as well as query, manipulate and serialize these instances.

While EMF models are canonically represented with the Ecore metamodel (see below), actual models are usually specified using XML Schema, annotated Java interfaces or UML (several UML tools are supported). A definition of the model by XML Schema provides the user with the benefit of obtaining an adapted and potentially optimized XML serialization format, while the two other methods are closer to the EMOF notion of Ecore. The specified models are subsequently used to generate an Ecore model. Models can be specified directly in Ecore as well, by means of a simple tree-based editor included in EMF. Furthermore, there is a Java API to create a model dynamically (which we are using for the proof-of-concept implementation and for future full-edged implementations of the transformation proposed in this work).

Ecore provides a subset of MOF concepts and hence of UML class modeling concepts. In fact, experience drawn from the development of Ecore has substantially influenced the definition of EMOF. Ecore and EMOF are limited to classes, attributes and relations. Ecore and EMOF are closed metamodels, i.e., they conform to themselves, so Ecore is itself an EMF model. In a typical use case, Ecore is found at the M2 and M3 levels simultaneously, i.e., modelers specify their user models with Ecore, omitting the definition of a proper metamodel.

Figure 5:
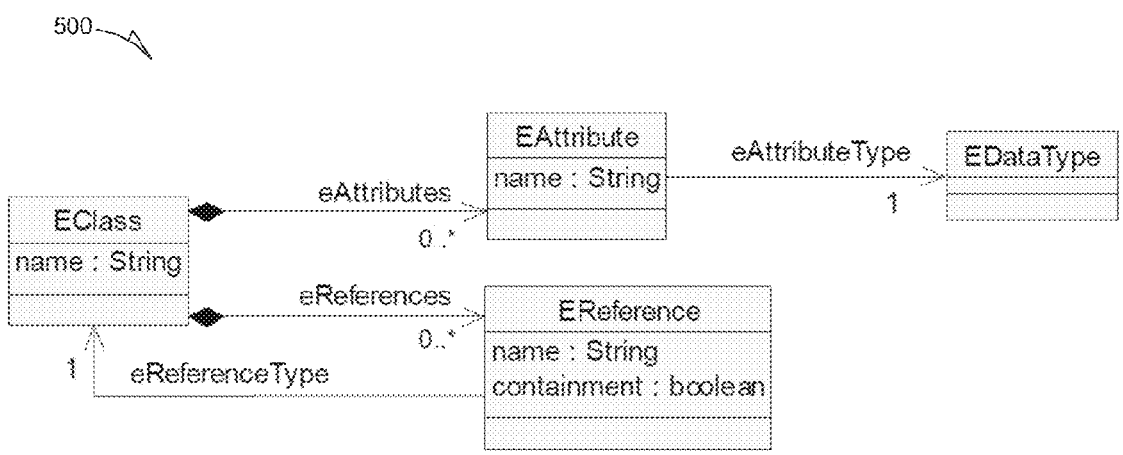
FIG. 5 illustrates a simplified version of the Ecore metamodel, in accordance with an example embodiment.

As noted above, with Ecore you can describe your domain with basically the same class modeling concepts as in UML: The metamodel class EClass is used to represent a class with a name and zero or more attributes and references, EAttribute is used to represent an attribute with a name and a datatype, EReference is used to represent one end of an association between two classes and has a name, a containment flag and a reference type, and finally EDatatype is used to represent a datatype. FIG. 5 illustrates a simplified version of the Ecore metamodel 500, in accordance with an example embodiment.

Because we make frequent use of the term EStructuralFeature in this work, we would like to add that both EAttribute and EReference are subclasses of EStructuralFeature in the full Ecore metamodel.

As stated above, one benefit of EMF is code generation. Based on your data model, EMF may generate application mode, which can be modified and customized to the needs of the developer. Subsequent changes to the model may be merged to existing code modifications as transparently as possibly. Along with the actual application, EMF may also generate unit tests, which help to secure the customization process. EMF provides also the possibility to generate a tree-based editor for your model, so you can manually create and modify instances of the model. The components of this editor can be reused to develop a more sophisticated editor.

Further benefits of using EMF are model change notification, transparent model persistence (in general, Ecore models as well as instances of Ecore models are serialized in XMI, but other ways and formats can be conceived), data integration and sharing, model validation, and an efficient reflective API.

The Object Constraint Language (OCL) is a declarative language for constraint and query expressions on UML and MOF (meta-) models. It is part of the Unified Modeling Language (UML) standard, but the OMG has defined subsets of OCL which can be applied to any MOF-compliant and EMOF-compliant models. OCL can be applied at different layers of the MOF four layer architecture 300 in FIG. 3. OCL is also a key-component of the OMG's standard for model transformations, QVT (Query/View/Transformation).

An OCL constraint may be structured into a context, zero or more stereotypes, and the actual OCL expressions. The context defines the scope of the constraint statement, e.g., a class, an interface etc. The stereotype determines which type of expression is applied to the context, i.e., invariants, preconditions, postconditions, etc. The actual expressions are specified in a syntax which is based object-oriented programming languages, and do usually resemble predicate logic expressions. If, for example, one would like to express, that a person is always younger than its parents, the OCL constraint may be composed as follows:

context Person inv:self.Parent→for All (ele.age>self.age)

Several different types of constraints can be distinguished: invariants; preconditions and postconditions; initial and derived values; definitions of new attributes and operations; model queries; and guards for state transitions.

Concepts of Semantic Web languages RDF(S) and OWL differ from Ecore. These differences are designated focal points of any transformation effort.

All things described in RDF(S) are called "resource" and are hence of type rdfs:Resource. The way this resource is used influences the representation of this resource in the Ecore model. Resources with type rdfs:Class are candidates for an EClass in Ecore:

ex:Student rdf:type rdfs:Class.

Resources with type rdf:Property are candidates for an EReference or EAttribute in Ecore:

ex:hasTitle rdf:type rdf:Property.

There is no strict separation between classes and instances ("individuals") in RDF(S) like there is in OWL DL. All resources of type rdfs:Class are classes, all resources of type rdfs:Property are properties. Following these definitions, all resources whose type is different from the above types or which have no type at all could be considered individuals.

In the case where none of these sets (classes, properties, individuals) overlap, the transformation can be handled in a similar way as the transformation from OWL DL to Ecore. However, a transformation from RDF(S) must also consider the following cases:

Class+Individual Any resource which is of type rdfs:Class and at least of one other type except rdfs:Property at the same time.

Class+Property Any resource which is of type rdfs:Class and of type rdfs:Property, but not of any other type at the same time.

Property+Individual Any resource which is of type rdfs:Property and at least of one other type except rdfs:Class at the same time.

Class+Property+Individual Any resource which is of type rdfs:Class, of type rdfs:Property and at least of one other type at the same time.

In OWL, the classes owl:Thing and owl:Nothing exist by default, where owl:Thing is the superclass of all classes and owl:Nothing is the subclass of all classes. This enforces a class hierarchy with exactly one class at the top and one class at the bottom. In Addition, owl:Thing serves as the set of all individuals.

Representations for owl:Thing and owl:Nothing may be created in the Ecore world, and especially owl:Thing may be used to model common traits which are shared by all classes and instances like its IRI. As in RDF(S), comparable predefined classes do not exist. A transformation from RDF(S) to Ecore has to provide other means to model common traits.

RDF(S) and OWL are both based on the open world assumption (OWA). In an open world, a statement is not per se false just because it is not known to be true. In contrast, when adopting the closed world assumption (CWA), everything that is not known to be true is false. Ecore, like many software engineering languages, is based on the closed world assumption. A transformation from Semantic Web ontologies to Ecore must consider this difference.

The term "Unique Name Assumption" (UNA) was coined in the context of description logic and ontologies. It refers to the assumption that different names refer to different entities. In RDF(S) and OWL, an IRI serves as identifier or name of an entity. As the unique name assumption is not valid in RDF(S) and OWL, two different IRIs can denote identical entities. In OWL, entities have to be explicitly declared different or identical to another entity; although RDF(S) does not make the unique name assumption either, no means to this purpose exist.

In Ecore, classes are organized in packages and identified by the class name. Inside a package, the class name must be unique. Different class names denote two separate classes. References and attributes are attached to a specific class. Inside this class, the names for references and attributes must be unique, and different names denote again separate entities. In consequence, one could state that Ecore makes the unique name assumption. Thus, a transformation from Semantic Web ontologies to Ecore may take this discrepancy into account.

RDF(S) and OWL, as opposed to Ecore, are both designed for information exchange and publication on the Web. Consequently, every entity and even modeling primitives are identified are identified via IRIs. Ecore and comparable software engineering facilities do not know a comparably consistent identification mechanism and are not designed for knowledge publication on the Web. Any transformation from Semantic Web languages to Ecore has to provide the possibility to preserve these features to a certain degree.

While in Ecore and comparable software modeling languages, references and attributes are attached to a specific class, properties are first-class citizens in RDF(S) and OWL and exist "on their own". As a consequence, domain and range specifications are not a limitation as to which individuals are allowed to be connected via the property in question; by connecting two individuals via a property, the type of the domain or range is "assigned" to the individuals.

In OWL, a property is either an object property, which connects individuals to other individuals, or a data property, which connects individuals to typed or untyped literals. RDF(S) does not make this distinction and allows the connection to individuals and literals via one and the same property. Also, the scope of application of properties in OWL is wider than in RDF(S). In the latter, properties are merely names which are attached to a relation of two resources. In OWL, it is possible to further qualify these relations with characteristics like symmetry, transitivity, reflexivity etc. In addition, properties can be used in OWL to further describe classes, e.g., by restricting the membership of a class in regards to the quality or the quantity of the relations of the members of the class concerning specific properties.

Another notable difference between RDF(S) and OWL DL is the case of properties which are at the same time classes (i.e., of type rdfs:Class).

In Semantic Web languages, certain aspects of properties can be specified in form of restrictions. Typically, these restrictions are applied to the domain and range of a property; OWL permits the restriction of the cardinality as well, i.e., the number of values a property may have for a particular individual. Restrictions allow inferring of additional information. As an example, if the range of a property hasFather is restricted to a maximum of one value, and Daedalus and Daidalos are known to be the father of Icarus, it can be inferred that Daidalos and Daedalus are identical, even if there is no statement asserting the sameness of both individuals.

The corresponding concept in Ecore is OCL constraints embedded into Ecore model entities. These constraints specify conditions which may not be violated; no additional information can be inferred from these constraints. In the above example, if Daedalus and Daidalos are both assigned as a value to Icarus' hasFather reference, the model would become invalid.

OWL and Ecore do not completely overlap in terms of expressiveness. As RDF(S) is much less expressive than OWL, great differences are to be expected in this domain between the transformation from OWL to Ecore and the transformation from RDF(S) to Ecore.

RDF(S) does not support cardinality constraints for properties. The cardinality is always implicitly constrained to 0..*. This is also the default behavior in OWL. However, in OWL, it is possible to restrict the membership of a class to members which fulfill specific cardinality conditions. In the Ecore world, the cardinality of attributes is by default set to 0..1, which is also what a software engineer would intuitively expect, e.g., for an attribute like age. By maintaining the implicit default cardinality from the ontology, the resulting Ecore model would, in the worst case, be cluttered with attributes which allow multiple values.

Semantic Web ontologies contain terminological knowledge as well as assertional knowledge. As entities may belong to both types of knowledge at the same time (at least in RDF(S) and OWL Full), no strict separation exists in RDF(S) and OWL. Ecore on the other hand, strictly separates its model in several layers, with separate files, diagrams etc.

Formal semantics form the basis of RDF(S) and OWL. OWL DL is actually a description logic. This allows for entailment of factual knowledge in RDFS or OWL ontologies by using rule-based inference engines for RDF(S) and so-called reasoners for OWL. These reasoners may perform subsumption checking, consistency checking, and instance classification. Via subsumption checking, it is possible to infer super- and subclass relations which are not explicitly specified in an ontology. For example, if in OWL a class Person is defined as the union of two classes Man and Woman, a reasoner will infer that Person is the superclass of both these classes. Consistency checking allows for detection of contradictions in an ontology. For example, if an individual is specified to be member of two disjoint classes, a reasoned will infer this to be inconsistent. With instance classification, it is possible to determine if an instance is a member of a specific class without being explicitly assigned to this class.

Figure 6:
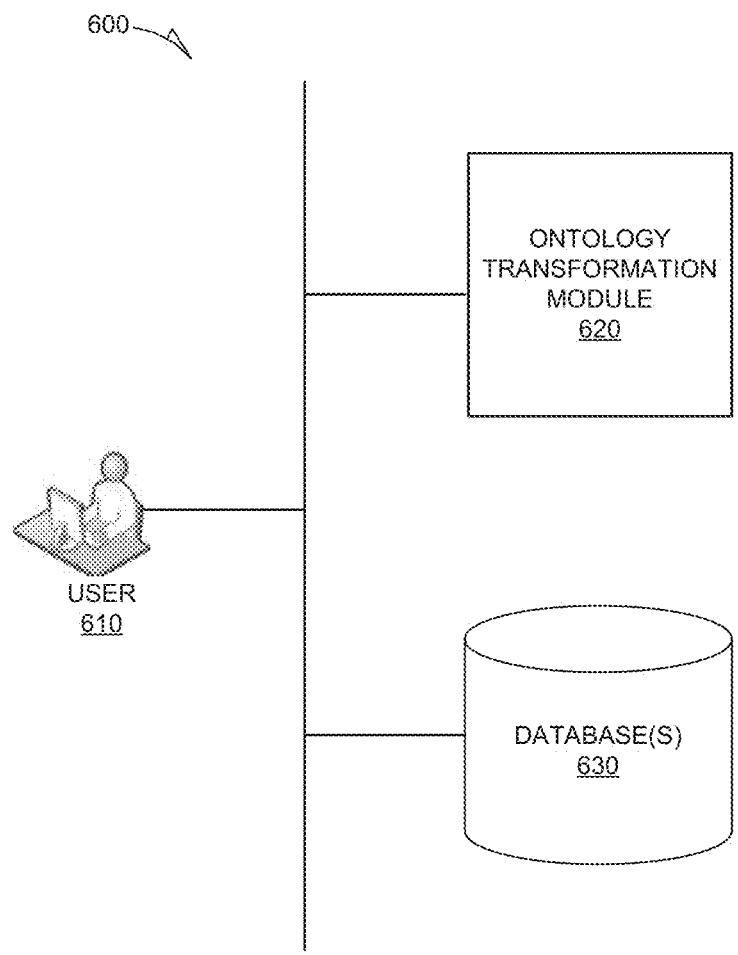
FIG. 6 is a block diagram of an ontology transformation system, in accordance with an example embodiment.

FIG. 6 is a block diagram of an ontology transformation system 300, in accordance with an example embodiment. The ontology transformation system 300 may comprise an ontology transformation module 620 on a machine having at least one processor. In some embodiments, the ontology transformation module 620 may be incorporated into the enterprise application platform 112 (e.g., reside on one or more of the application servers 126). The ontology transformation module 620 may be configured to enable a user 610 on a device (e.g., any of machines 116, 117, and 122 in FIG. 1) to adjust configuration settings for a transformation of primitives of a Semantic Web ontology language into primitives of a software modeling language. The ontology transformation module 620 may also be configured to store the adjusted configuration settings on a storage device. For example, the adjusted configuration settings may be stored in a configuration file in one or more database(s) 630, which may be accessed by the ontology transformation module 620 for later retrieval and use. In some embodiments, the database(s) 630 may be incorporated into the database(s) 130 in FIG. 1. However, it is contemplated that other configurations are also within the scope of the present disclosure. The ontology transformation module 620 may further be configured to perform the transformation of primitives of the Semantic Web ontology language into primitives of the software modeling language using the stored adjusted configuration settings. The ontology transformation module 620 may also be configured to enable a selection of the stored adjusted configuration settings for use in a subsequent transformation of primitives of the Semantic Web ontology language into primitives of the software modeling language.

In some embodiments, the ontology transformation module 620 is further configured to generate Object Constraint Language (OCL) constraints for primitives of the software modeling language. In some embodiments, the semantic web language is Resource Description Framework Schema (RDFS). In some embodiments, the semantic web language is Web Ontology Language (OWL). In some embodiments, the software modeling language is Ecore. In some embodiments, the primitives of the Semantic Web language comprise classes, properties, individuals, and resources. In some embodiments, the ontology transformation module may be further configured to enable the user or another user to adjust the adjusted configuration settings for use in the subsequent transformation of primitives of the Semantic Web ontology language into primitives of the software modeling language. The ontology transformation module 620 may also be configured to perform any of the features disclosed herein with respect to ontology transformation.

Figure 7:
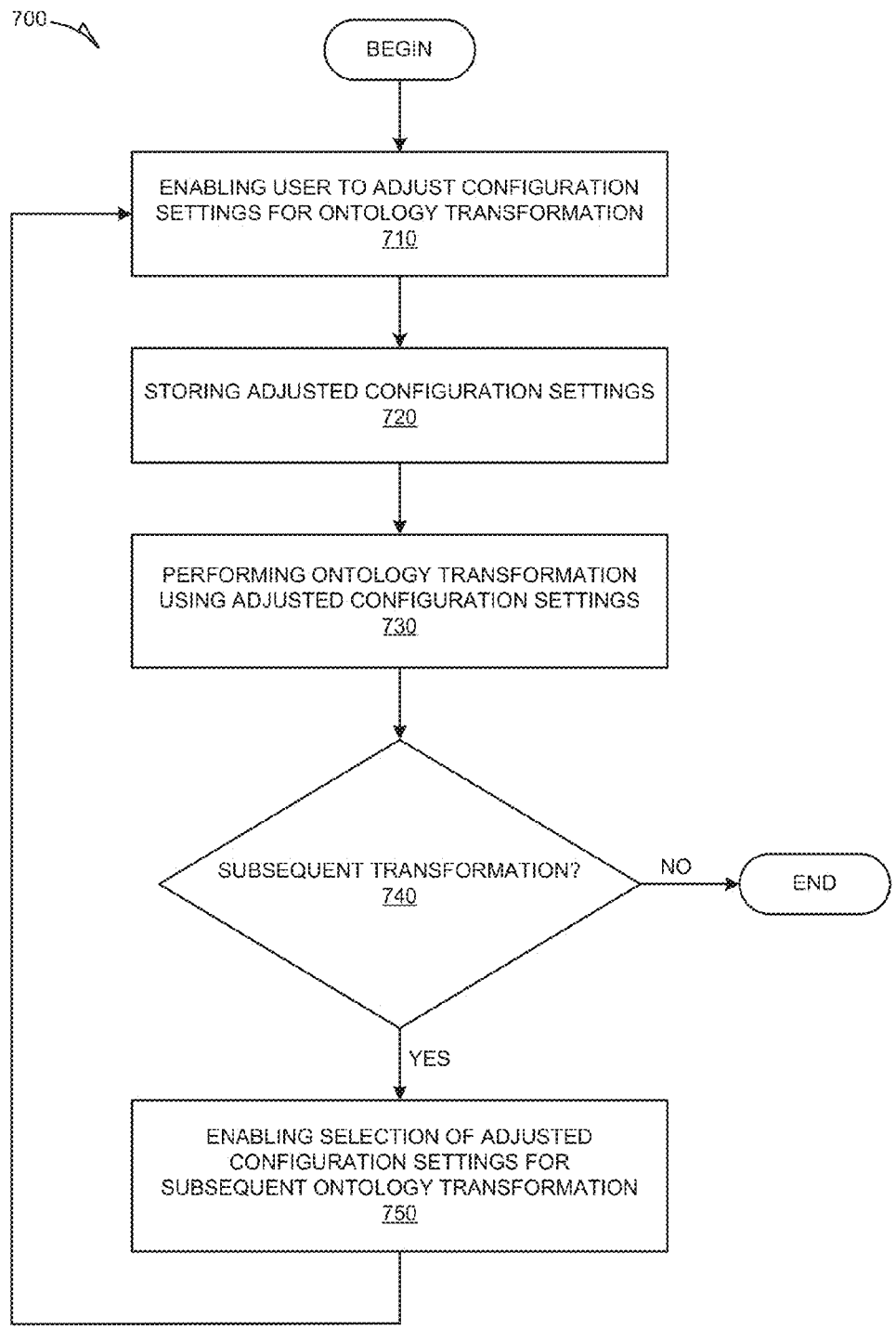
FIG. 7 is a flowchart illustrating a method of transforming a Semantic Web language ontology into a software meta-model and model, in accordance with an example embodiment.

FIG. 7 is a flowchart illustrating a method 700 of transforming a Semantic Web language ontology into a software meta-model and model, in accordance with an example embodiment, in accordance with an example embodiment. It is contemplated that the operations of method 700 may be performed by a system or modules of a system (e.g., ontology transformation module 620 in FIG. 6).

At operation 710, a user may be enabled to adjust configuration settings for a transformation of primitives of a Semantic Web ontology language into primitives of a software modeling language. In some embodiments, adjusting the configuration settings may include selecting an option to generate Object Constraint Language (OCL) constraints for primitives of the software modeling language. It is contemplated that other configuration settings are also within the scope of the present disclosure. Other examples of configuration settings will be discussed in further detail below.

At operation 720, the adjusted configuration settings may be stored on a storage device. In some embodiments, the adjusted configuration settings may be stored along with other configuration settings in one or more configuration file.

At operation 730, the transformation of primitives of the Semantic Web ontology language into primitives of the software modeling language may be performed using the adjusted configuration settings stored on the storage device.

At operation 740, it may be determined whether a subsequent transformation of primitives of the Semantic Web ontology language into primitives of the software modeling language will be performed.

If it is determined that a subsequent transformation will be performed, then the method 700 may proceed to operation 750, where the user, or another user, may be enabled to select the adjusted configuration settings stored on the storage device for use in the subsequent transformation of primitives of the Semantic Web ontology language into primitives of the software modeling language.

The method 700 may then return to operation 710, where the user may be enabled to adjust the selected configuration settings for use in the subsequent transformation.

If it is determined at operation 740 that a subsequent transformation will not be performed, then the method 700 may come to an end.

It is contemplated that any of the other features described within the present disclosure may be incorporated into method 700. Furthermore, in some embodiments, all of the operations in method 700 may be performed in the same session. However, in some embodiments, the some of the operations may be performed in separate sessions. For example, in some embodiments, the adjusting of configuration settings (operation 710), storing of configuration settings (operation 720), and performing of the transformation (operation 730) may be performed while the user is accessing the ontology transformation module 620. The user may then stop use of the ontology transformation module 620 (e.g., log off, shut down computing device being used to access the ontology transformation module 620). Later, the user may return to using the ontology transformation module 620 (e.g., turn computing device back on, log on), at which time the selection of the stored adjusted configuration settings (operation 750) may be performed during a separate session as the previously performed operations.

Figure 8:
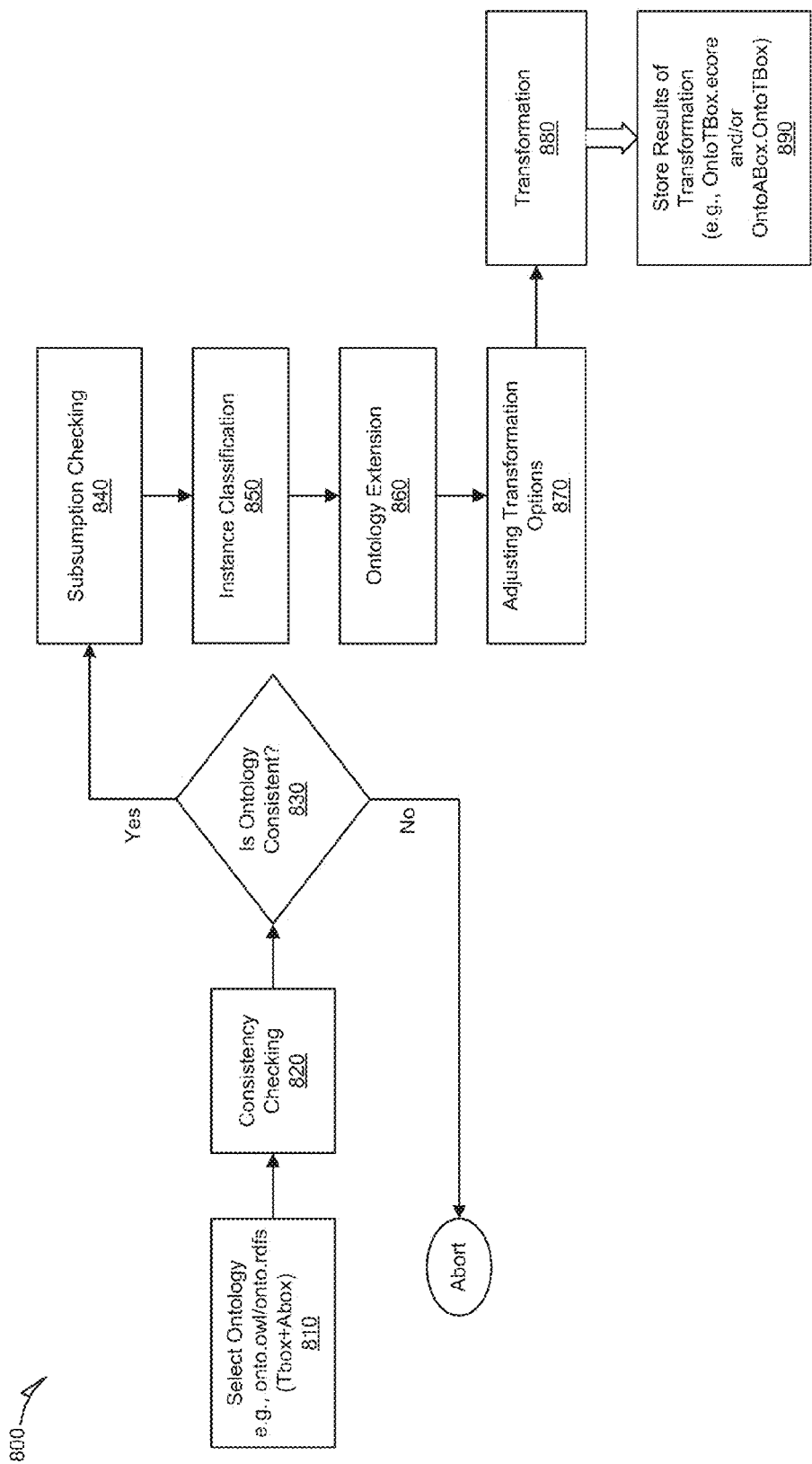
FIG. 8 is a flowchart illustrating another method of transforming a Semantic Web language ontology into a software meta-model and model, in accordance with an example embodiment.

FIG. 8 is a flowchart illustrating another method 800 of transforming a Semantic Web language ontology into a software meta-model and model, in accordance with an example embodiment. It is contemplated that the operations of method 800 may be performed by a system or modules of a system (e.g., ontology transformation module 620 in FIG. 6).

At operation 810, the ontology to be transformed may be selected. The selection may comprise a file containing the ontology or a URL leading to an ontology. In some embodiments, the ontology is either an RDF(S) ontology or an OWL ontology.

At operation 820, the selected ontology may be checked for consistency. In consistency checking, the terminal knowledge (TBox) and assertional knowledge (ABox) of an ontology may be tested for contradictions. For example, if an individual is specified to be member of two disjoint classes, a reasoner may infer this to be inconsistent. If the given ontology is found to be inconsistent at operation 830, then the transformation process may aborted.

If the given ontology is found to be consistent at operation 830, then the method 800 may proceed to operation 840, where subsumption checking may be performed. The subsumption checking may allow for the inference of super- and sub-class relations which are not explicitly specified in an ontology. For example, if, in OWL, a class Person is defined as the union of two classes Man and Woman, a reasoner may infer that Person is the superclass of both these classes.

At operation 850, instance classification may be performed. In instance classification, it may be determined if an individual (also called instance) is a member of a specific class without being explicitly assigned to this class.

At operation 860, based on the result of the subsumption checking and the instance classification, the ontology may be extended with helper classes in order to have an explicit manifestation of all implicit knowledge, as well as to ensure that no instances are members of classes with no sub- or super-class relationship.

At operation 870, the user may be able to make transformation decisions, both general and entity specific (classes, properties, individuals), each one contributing either to information preservation or to obtaining simpler and cleaner software models. The user may adjust configuration settings for the transformation accordingly.

At operation 880, based on the transformation decisions, the actual transformation of all primitives of the selected ontology may be performed.

At operation 890, the result of the transformation may be stored. The result may be stored in two places, one containing the former TBox representing the meta-model in Ecore terminology, the other containing the former ABox, i.e., the instance of the meta-model.

It is contemplated that any of the other features described within the present disclosure may be incorporated into method 800.

In some embodiments of the transformation of RDF(S) modeling concepts or primitives, every modeling concept or primitive may be transformed to an appropriate counterpart in the Ecore world in such a way that maximizes adjustability and information preservation.

A resource is considered to be a simple resource if it is exclusively a class, a property or an individual. Conditions that may determine if a resource falls into the respective category are specified below.

Class may be any resource which is of type rdfs:Class, but not of any other type. Classes in RDF(S) ontologies can be mapped to corresponding EClasses. The class hierarchy can be maintained by mapping the rdfs:subClassOf property to the eSuperTypes reference in EClass.

The class hierarchy might contain classes which are of no interest to the software engineer, and which he might not want to retain in his Ecore model. In order to enable him to repeatedly apply the transformation without having to erase the respective classes each time by hand, the engineer can specify for each class if he wants to retain this class for transformation or not. If he decides to omit a class, all its subclasses will not be transformed either. This is true as well for individuals which are members of one or more of the omitted classes, and for properties whose range or domain class is omitted.

As mentioned above, RDF(S) does not provide a common superclass for all classes, in contrast to OWL (owl:Thing). For several reasons which are described in the respective sections below, such a common top-level class may be introduced for the transformation. In analogy to OWL, this class may be called rdfs2ecore:Thing.

In RDF(S), IRIs may be used to precisely identify resources and therefore classes. No corresponding notion exists in Ecore. Elements in a model are, at best, identified by memory pointers or by GUIDs.

When an Ecore model is used to generate Java code, a combination of the name attribute of an EClass with the name attribute of the EPackage which contains the EClass may be used to form the fully qualified class name of the generated Java class. In Java, a class may thus be identified by its fully qualified class name. An algorithm to map the URI of an XML namespace to the attributes of an EPackage and to a fully qualified Java package name may be given. This algorithm can serve as a default method for creation of EPackages within the transformation process, as long as the class in question is associated with a namespace. If no namespace is associated to the class, the necessary EPackage attributes either have to be specified by the software engineer beforehand or generated automatically.

As the above mentioned algorithm does not represent an injective function, and as resources are not required to be part of any namespace, it is still desirable to maintain the original IRI elsewhere in the Ecore model. The concept of annotations proposed by Ecore can be used to embed the IRI into an EClass. For a class ex:Pizza, this annotation may look like this:

| | |
|---|---|
| Source | = "http://www.sap.com/owl2ecore#EntityAnnotation" |
| Key | = "nsPrefix" |
| Value | = "ex" |
| Key | = "nsIRI" |
| Value | = "http://example.org#" |
| Key | = "LocalName" |
| Value | = "Pizza" |
| Key | = "IRI" |
| Value | = "http://example.org#Pizza" |

A simplified algorithm for the transformation of classes may be as follows:
1. Create an empty Ecore metamodel.
2. Create an instance of EClass for the common top-level class and add it to the Ecore metamodel.
3. For each top class of the ontology's class hierarchy (i.e., the classes which have no superclasses), create an instance of EClass and add it to the Ecore metamodel.
4. Add the common top-level class to the eSuperTypes reference of all of the EClass instances corresponding to the top classes.

5. Do the following for each top class:
   a) Create an EAnnotation containing the IRI of the current class and add it to the instance of EClass.
   b) Create an instance of EClass for each of the current class's subclasses and add them to the model. If an instance of EClass for a subclass does already exist in the Ecore metamodel, use this instance rather than creating a new one.
   c) Add the current class to the eSuperTypes reference of all of the EClass instances corresponding to its subclasses.
   d) Repeat steps 5a to 5d for all of the current class's subclasses.

Property may be any resource which is of type rdfs:Property, but not of any other type. Properties in RDF(S) may be used to express relations between resources. The corresponding modeling construct in Ecore are Structural Features, namely EAttribute and EReference. While properties are first-class citizens in the RDF(S) world, i.e., they can exist on their own without being attached to a class, structural features in Ecore are always contained by an EClass.

In order to transform a property, we may determine an EClass as target, to which we can attach the structural feature corresponding to the property in question. For properties which are restricted to a certain domain, this EClass can be derived from this restriction:
   If the domain of the property is restricted to exactly one class, the EClass corresponding to this class can be used as the target.
   If the domain of the property is composed of several classes, we need to introduce a helper class which is a superclass of all domain classes (and only of these). This helper class will then be the target for the structural feature.

If no domain restriction exists for the property in question, the domain of the property may be the set of all classes, which in OWL is manifested by the class owl:Thing, the supertype of all classes. The EClass corresponding to owl:Class may be used as target for properties without domain restriction. In RDF(S) however, no class which is the superclass of all classes exists. For the purpose of transforming properties without this type of restriction (and other purposes, see below), a helper class may be introduced into the Ecore model similar to the Ecore expression of owl:Thing and should hence be called rdfs2ecore:Thing. The structural feature is consequently added to this EClass.

In contrast to OWL, RDF(S) does not distinguish between object properties and data properties. This renders a direct mapping to EReference and EAttribute impossible. While in OWL object properties are used to link individuals to individuals and data properties are used to link individuals to data values, properties in RDF(S) always link individuals to individuals, as all literal values (i.e., data values) are considered to be instances of rdfs:Datatype (which is itself a subtype of rdfs:Class) and hence individuals.

To be able to determine whether a property should be transformed into an EReference or an EAttribute, the range specification for the resp. property has to be taken into account. If the range comprises only instances of rdfs: Datatype, an EAttribute may be used. The datatype of the EAttribute may be determined as follows:
   If the range consists of exactly one datatype, the corresponding Ecore datatype may be chosen. The details of datatype mapping are discussed below.
   If the range consists of several instances of multiple distinct datatypes, the datatype may be set to EString, and all values of the corresponding property may be transformed as character strings without type interpretation.

In all other cases, an EReference may be used. The type of the EReference may be determined as follows:
   If the range is restricted to exactly one class, the EClass corresponding to this class may be used as the eReferenceType of the EReference.
   If the range of the property is composed of several classes, a helper class which is a subclass of all range classes (and only of these) may be introduced. This helper class may then be used as the eReferenceType of the EReference.
   If no range restriction exists, the Ecore class Thing may serve as the eReferenceType of the EReference.

A simplified algorithm for the transformation of properties may be as follows:
1. Iterate over all properties and determine the necessary helper classes:
   For all properties which have multiple classes as domain, a helper class which is a subclass of all domain classes may be introduced into the ontology.
   For all properties which have multiple classes as range, a helper class which is a subclass of all range classes may be introduced into the ontology.
   Every domain and range consists of exactly one class now (except for properties which have one or more datatypes as range).
2. Transform the ontology's class hierarchy.
3. Iterate over all properties:
   Retrieve the EClass instance corresponding to the properties' domain from the Ecore metamodel.
   Create an EReference for all properties which have a class as range and add it to the eStructuralFeatures container of to the EClass instance corresponding to the domain class. The type of this EReference may be the EClass instance corresponding to the range class.
   Create an EAttribute for all properties which have one or more datatypes as range and add it to the eStructuralFeatures container of to the EClass instance corresponding to the domain class. If the range consists of exactly one datatype, the type of this EAttribute may be the Ecore counterpart of this datatype; in any other case, the type may be EString.

Individual may be any resource which is of any other type than rdfs:Property or rdfs:Class. A similar concept of instances of classes (or individuals) exists in both worlds, RDF(S) and Ecore. However, several differences emerge when looking at the details.

As noted above, IRIs may be used in RDF(S) to identify resources. Thus, with the exception of blank nodes, all individuals in RDF(S) may be associated to such an IRI. In Ecore, instances are merely objects in the terms of object-oriented programming and are exclusively identified by their memory address. In contrast to classes, they have no corresponding meta-modeling construct which could be subject to annotations. In order to retain the information incorporated by the IRI, special EAttributes may be added to every class, i.e., to the common superclass rdfs2ecore:Thing which was introduced above. The values for these attributes can be retrieved analogously to the method for classes as described above.

RDF(S) allows multiple class membership for individuals, even if these classes are not in a sub- or super-class relationship. This is per se not possible in Ecore. An object in Ecore can only be an instance of two or more classes: 1.) if these classes are in a sub- or super-class relationship, or 2.) if the object is at the same time an instance of a class which is, by means of multiple inheritance, a subclass of all classes in question. In order to be able to transform individuals where none of these conditions are met, the class hierarchy may be enhanced by adding helper classes which fulfill the second condition. The respective individuals can then be transformed to instances of this helper class in Ecore.

A way to determine which helper classes are needed and at which location in the class hierarchy they have to be inserted may comprise an equivalence relation on the set of individuals being defined, and a subgraph of the inheritance graph (i.e. the class hierarchy) for each resulting equivalence class being constructed by determining the so-called membership classes. The helper classes may then be defined as a subclass of the bottom classes of each subgraph. The bottom classes of an inheritance graph may be the classes whose indegree in the directed subgraph is 0, i.e., the classes which do not have subclasses themselves.

Figure 9:
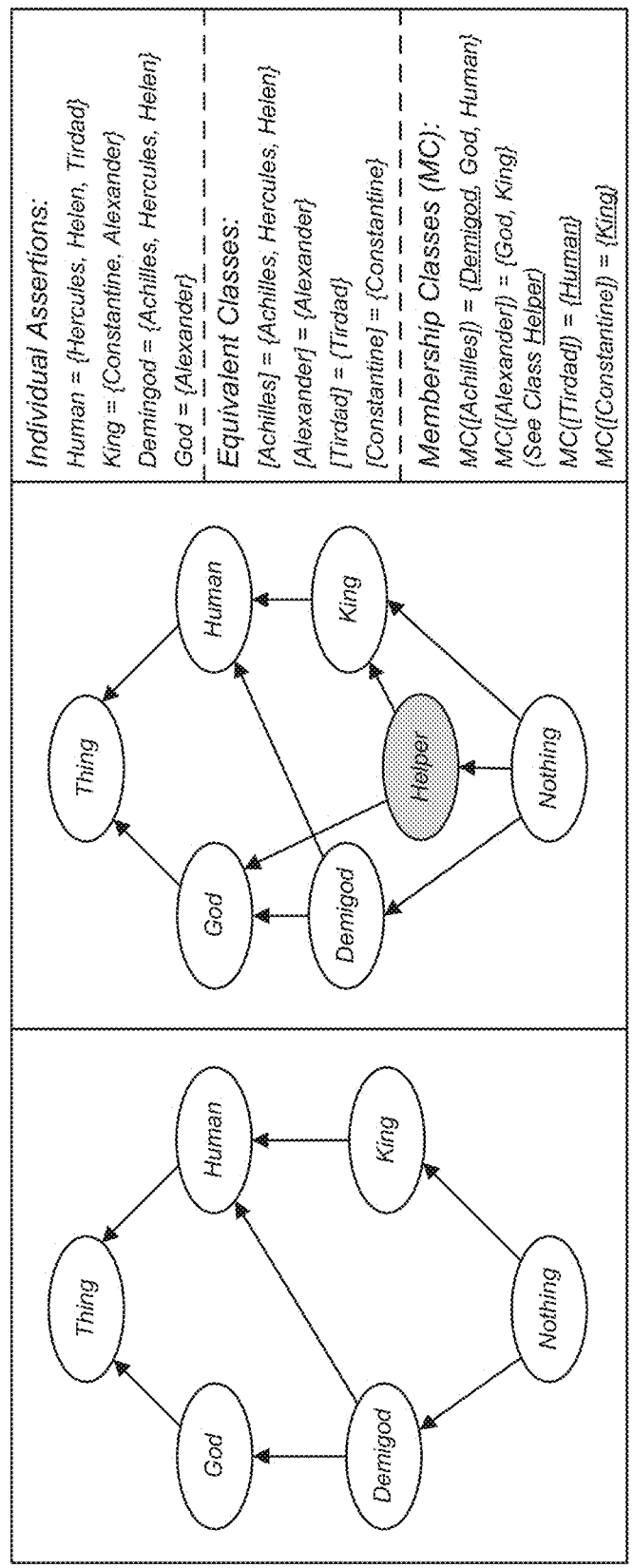
FIG. 9 illustrates an improved helper class generation, in accordance with an example embodiment.

This method can be applied to the transformation from RDF(S) to Ecore as well. The following improvement may be employed: If any helper class which was introduced as described above has an outdegree of exactly 1 in the directed subgraph (i.e., it has only one superclass), it can be omitted and instances in the equivalence class associated to this helper class can be transformed as instances of the corresponding superclass. FIG. 9 illustrates an improved helper class generation 900, in accordance with an example embodiment.

In the transformation, the software engineer can decide for every helper class if he prefers not to add it to the ontology, in which case the affected individuals cannot be transformed to Ecore.

A simplified algorithm for the transformation of individuals may be as follows:
1. Iterate over all individuals and insert the necessary helper classes into the ontology.
2. Transform the ontology's class hierarchy.
3. Transform the properties of the ontology.
4. Create an empty Ecore model.
5. Iterate over all individuals:
    a) Retrieve the EClass instance corresponding to the individual's type from the Ecore metamodel.
    b) Obtain an EObject instance for this individual by instantiating the EClass instance retrieved in step 5a; add it to the Ecore model (not the metamodel).
    c) Iterate over all the properties in the ontology whose subject is the current individual and retrieve the Ecore counterpart of all objects of these properties either from the Ecore model or as an instance of an Ecore datatype. Set the value of the EStructuralFeature corresponding to the property accordingly; skip, if the object is an individual whose counterpart is not yet in model.
    d) Iterate over all the properties in the ontology whose object is the current individual and retrieve the Ecore counterpart of all subjects of these properties from the Ecore model. Set the value of the subject's EStructuralFeature corresponding to the property accordingly.

A resource may be considered to be a complex resource if it is used in the RDF(S) ontology as any combination of class, property or instance. Conditions which may determine if a resource falls into the respective category are specified below.

When transforming complex resources, as in the Ecore world, entities can never be more than one of class, property or instance at the same time. Complex resource may therefore be mapped to distinct representations of these concepts in Ecore. The transformation may be able to provide a link between these representations in order to preserve as much information available in the ontology as possible.

As shown above, the following representations may exist:
A class is represented by an instance of EClass.
A property is represented either by an EReference or by an EAttribute.
An individual is represented by an instance of an instance of EClass.

If a resource which is a combination of one of the above types is about to be transformed, the software engineer can choose to omit one or more of the representations. For example, if a resource is used as a class and as an instance throughout the ontology, the software engineer can choose to only create a representation for the class aspect of the resource.

If multiple representations are chosen, the software engineer can decide that a kind of link should be established between the representations. The characteristics of the link may depend on the selected representations and are detailed below.

Figure 10:
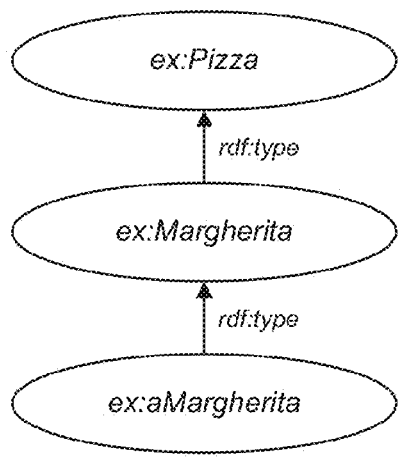
FIG. 10 illustrates an RDF graph showing a resource being used as both a class and an individual, in accordance with an example embodiment.

Class and Individual may be any resource which is of type rdfs:Class and at least of one other type except rdfs:Property at the same time. A resource may be used as both a class and an individual, as shown in FIG. 10, which illustrates an RDF graph 1000 showing a resource being used as both a class and an individual, in accordance with an example embodiment, and as follows:

ex:Margherita rdf:type ex:Pizza.
ex:aMargherita rdf:type ex:Margherita.

Here, ex:Margherita is used as type of ex:aMargherita, and is thus of type rdfs:Class. ex:Margherita is of type ex:Pizza, and is therefore an individual.

If a resource is used as both, class and individual, either the individual representation, the class representation or both can be omitted. In the case of partial omission, the remaining representation can be transformed according to the process described above. If both representations are omitted, the resource will not be transformed at all.

If both representations are retained, the resource may first be transformed separately as a class (e.g., as class Margherita, an instance of EClass) and subsequently as an instance of a class (e.g., as an instance of class Pizza, which is itself an instance of EClass). In order to maintain the information that multiple representations for one and the same resource were created, the following EAnnotation may be added to the class representation:

```
Source  = "http://www.sap.com/rdfs2ecore#individualRepresentation"
Key     = "nameOfIndividual"
Value   = "Margherita"
Key     = "namespacePrefixOfIndividual"
Value   = "ex"
```

If OCL is enabled for the transformation of this entity, the following entry may be added to the annotation:

```
Key     = "OCL"
Value   = rdfs2ecore::Thing.allInstances( )->select(t : rdfs2ecore::
          Thing | t.nameOfIndividual = "Margherita" and t.
          namespacePrefixOfIndividual = "ex")
```

The OCL query code above can be retrieved from the annotation and subsequently executed by the software engineer. It may return the actual object which represents the instance. EMF may provide support for this in the generated model editor for manual execution, as well as for programmatic execution in the application using the generated model code.

A simplified algorithm for the transformation of resources in this category may be as follows:
1. Create EClass for the class representation.
2. Annotate EClass created in step 1 with the references to the individual representation.
3. Obtain EClass corresponding to the type of the individual representation.
4. Create instance of the EClass retrieved in step 3.

Figure 11:
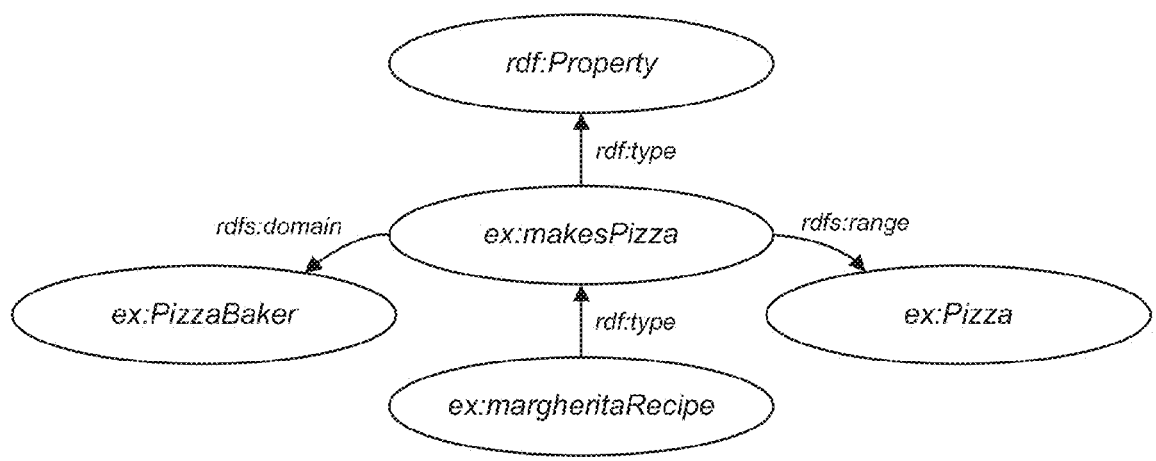
FIG. 11 illustrates an RDF graph showing a resource being used as both a class and a property, in accordance with an example embodiment.

Class and Property may be any resource which is of type rdfs:Class and of type rdfs:Property, but not of any other type at the same time. A resource may be used as both a class and a property, as shown in FIG. 11, which illustrates an RDF graph 1100 showing a resource being used as both a class and a property in accordance with an example embodiment, and as follows:
ex:makesPizza rdf:type rdf:Property.
ex:makesPizza rdfs:domain ex:PizzaBaker.
ex:makesPizza rdfs:range ex:Pizza.
ex:margheritaRecipe rdf:type ex:makesPizza.

Here, ex:makesPizza is used as type of ex:margheritaRecipe, and is thus of type rdfs:Class. ex:makesPizza is of type rdf:Property, and is therefore a property.

If a resource is used as both a class and a property, either the property representation, the class representation, or both can be omitted. In the case of partial omission, the remaining representation can be transformed according to the process described above. If both representations are omitted, the resource will not be transformed at all.

If both representations are retained, the resource may first be transformed separately as a class and as a property. The class may consequently be represented by an EClass, the property by an EStructuralFeature; the name of the resp. EStructuralFeature, as well as the name of its container class and the name of the container class's package, are stored as an EAnnotation to the EClass of the class representation:

```
Key    = "featureName"
Value  = "makesPizza"
Key    = "className"
Value  = "PizzaBaker"
Key    = "packageName"
Value  = "ex"
```

In analogy, an EAnnotation may be added to the EStructuralFeature representing the property:

```
Source = "http://www.sap.com/rdfs2ecore#classRepresentation"
Key    = "className"
Value  = "makesPizza"
Key    = "packageName"
Value  = "ex"
```

A simplified algorithm for the transformation of resources in this category may be as follows:
1. Create EClass for the class representation.
2. Annotate EClass created in step 1 with the references to the property representation.
3. Create EStructuralFeature and add it to the EClass corresponding to the domain of the property representation.
   Annotate EStructuralFeature created in step 3 with the references to the class representation.

Figure 12:
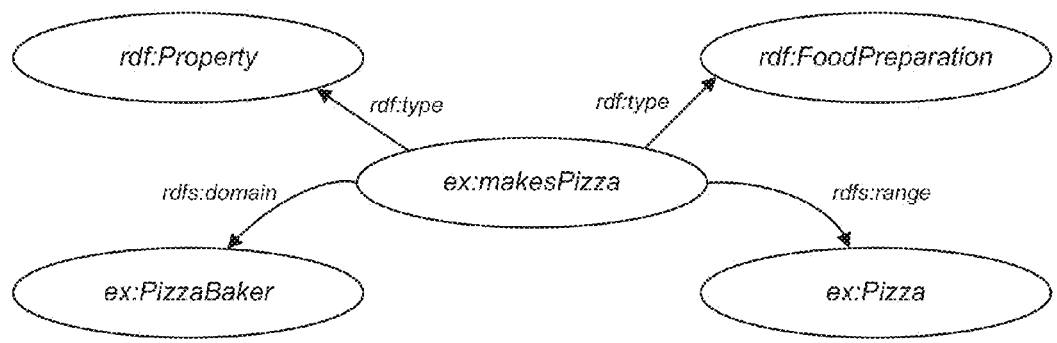
FIG. 12 illustrates an RDF graph showing a resource being used as both a property and an individual, in accordance with an example embodiment.

Property and Individual may be any resource which is of type rdfs:Property and at least of one other type except rdfs:Class at the same time. FIG. 12 illustrates an RDF graph 1200 showing a resource being used as both a property and an individual in accordance with an example embodiment, and as follows:

```
ex:makesPizza rdf:type ex:FoodPreparation
ex:makesPizza rdf:type rdf:Property
ex:makesPizza rdfs:domain ex:PizzaBaker
ex:makesPizza rdfs:range ex:Pizza
```

Here, ex:makesPizza is of type rdf:Property, and is therefore a property. ex:makesPizza is of type ex:FoodPreparation, and is therefore an individual.

If a resource is used as a property and as an instance of a class, any of these representations can be omitted. If either only the property representation or the individual representation is retained, the transformation can be performed according to the process described above for properties, i.e., individuals.

If both the property representation and the individual representation are retained, the resource may first be transformed separately as a property and as an individual, which results in an EStructuralFeature as a representation of the property and an instance of a class (which itself is an instance of an EClass). To establish the link between these representations, an EAnnotation may be added to the EStructuralFeature:

```
Source = "http://www.sap.com/rdfs2ecore#individualRepresentation"
Key    = "nameOfIndividual"
Value  = "makesPizza"
Key    = "namespacePrefixOfIndividual"
Value  = "ex"
```

If OCL is enabled for the transformation of this entity, the following entry may be added to the annotation:

```
Key   = "OCL"
Value = rdfs2ecore::Thing.allInstances( )->select(t : rdfs2ecore::
        Thing | t.nameOfIndividual = "makesPizza" and t.
        namespacePrefixOfIndividual = "ex")
```

The above OCL query code can be retrieved and executed by the software engineer in order to get the actual object which represents the instance.

A simplified algorithm for the transformation of resources in this category may be as follows:
1. Create EStructuralFeature and add it to the EClass corresponding to the domain of the property representation.
2. Annotate EStructuralFeature created in step 1 with the references to the individual representation.
3. Obtain EClass corresponding to the type of the individual representation.
4. Create instance of the EClass retrieved in step 3.

Figure 13:
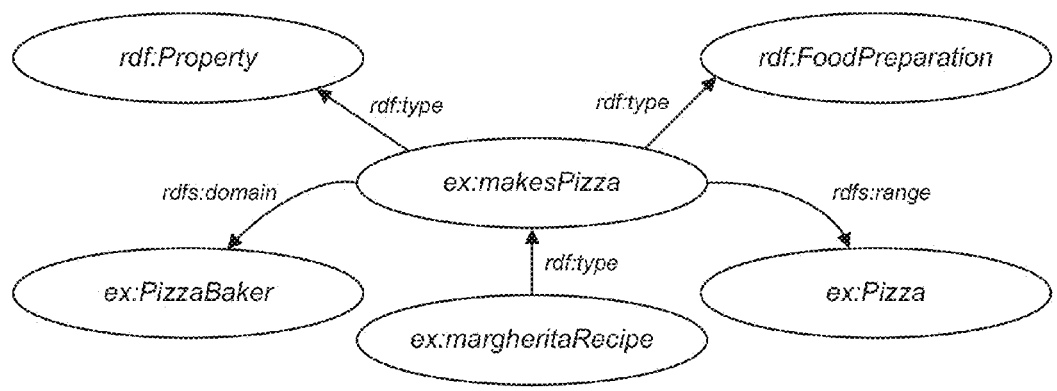
FIG. 13 illustrates an RDF graph showing a resource being used as both a class, a property, and an individual, in accordance with an example embodiment.

Class, Property and Individual may be any resource which is of type rdfs:Class, of type rdfs:Property and at least of one other type at the same time. FIG. 13 illustrates an RDF graph 1300 showing a resource being used as both a class, a property, and an individual in accordance with an example embodiment, and as follows:

```
ex:makesPizza rdf:type ex:FoodPreparation
ex:makesPizza rdf:type rdf:Property
ex:makesPizza rdfs:domain ex:PizzaBaker
ex:makesPizza rdfs:range ex:Pizza
ex:margheritaRecipe rdf:type ex:makesPizza
```

Here, ex:makesPizza is used as type of ex:margheritaRecipe, and is thus of type rdfs:Class. ex:makesPizza is of type rdf:Property, and is therefore a property. ex:makesPizza is of type ex:FoodPreparation, and is therefore an individual.

If a resource is used as all three, class, property and instance, either one can be omitted. In the case of omission, the remaining representation can be transformed according to the process described above. If all three representations are retained, the links between these representations can be established pair wise as described in the paragraphs above.

A simplified algorithm for the transformation of resources in this category may be as follows:

1. Create EClass for the class representation.
2. Annotate EClass created in step 1 with the references to the property representation.
3. Annotate EClass created in step 1 with the references to the individual representation.
4. Create EStructuralFeature and add it to the EClass corresponding to the domain of the property representation.
5. Annotate EStructuralFeature created in step 4 with the references to the class representation.
6. Annotate EStructuralFeature created in step 4 with the references to the individual representation.
7. Obtain EClass corresponding to the type of the individual representation.
8. Create instance of the EClass retrieved in step 7.

In RDF(S) data values may be represented by the means of literals. The value of such a literal may be described by a sequence of characters. RDF(S) allows untyped and typed literal values. The specification of a datatype for a literal can be used when interpreting this value, e.g., as a number, a date or a text string. A datatype may be specified by a URI, which refers to a datatype definition. Datatypes can be defined with the XML Schema Definition Language (XSD). It is up to the application which processes an RDF(S) document to figure out how to handle the given datatype. Hence, the W3C suggest the use of the predefined XML Schema datatypes.

The only predefined RDF datatype is rdf:XMLLiteral. This datatype is used to allow embedding XML content as literal values into XML ontology documents without this content being interpreted as being RDF(S).

In the transformation, the predefined XML Schema datatypes can be mapped to corresponding built-in EDataType. As untyped and typed literals are given as text strings in an RDF(S) document, we can transform every untyped literal and literals whose type is not one of the predefined XML Schema datatypes to the Ecore datatype EString.

Besides the basic modeling features discussed in the above sections, RDF(S) provides primitives to model more complex data structures, viz. containers, collections and nested propositions. The transformation details of these primitives are introduced in this section.

RDF(S) features several modeling primitives to describe groups of things and structures that resemble lists. These primitives allow the construction of groups in two distinct ways, either with containers and/or with collections.

A container in the RDF(S) context may be a group of objects, which can always be extended with further elements via the addition of RDF(S) triples. However, there is no way to express that this group is closed and complete. A container can thus be considered to be an open list.

The RDF equivalent of a closed list is a collection. Once a container is initially defined, it is impossible to append further elements just by adding new RDF(S) triples. This allows expressing that a list contains all possible entries and is thus complete.

In both cases, the goal is to model a relation between one subject to multiple objects. It should be noted that both concepts are not introducing new expressivity to what can already be expressed via individual RDF(S) triples, but rather are "syntactic sugar" and allow for more concise serializations. Consequently, all occurrences of these concepts can be mapped to EAttributes and EReferences with cardinality 1..* in the Ecore model as described above. However, these constructs provide a unified way to represent lists by the use of standard classes and identifiers instead of specific, customized solutions using individual triples. While this fact doesn't have any semantic impact (i.e., an ordered list is an ordered list, even if it is not expressed in a standard way), certain additional information can be automatically extracted and used for the transformation to Ecore.

The following types of containers may be provided by RDF(S):

Bag (a resource of type rdf:Bag)
Sequence (rdf:Seq)
Alternative (rdf:Alt)

These predefined RDF types enable the ontologist to specify his (informal) intention about how a group of resources or literals should be interpreted in a given application, but they have no influence on the RDF graph structure and carry no formal semantics. The W3C proposes the following interpretations:

A Bag represents a group of resources or literals without any relevance of the order of its members. It may contain duplicate members.

A Sequence represents a group of resources or literals which are arranged in an ordered sequence, and which may contain duplicate members as well. A sequence can thus be seen as an ordered list.

An Alternative represents a group of resources or literals which are to be interpreted as equivalent alternatives.

As each of these cases differ in regards to the interpretation of the order of a group's members, as well as the occurrence of duplicate members, we can use these interpretations to refine the EAttribute or EReference corresponding to the one-to-many relation which are modeled by the container in question. EAttribute and EReference are both subclasses of EStructuralFeature, and as such have both the properties ordered and unique. Ordered specifies whether the order of values is significant, and unique specifies whether duplicate elements are allowed.

For Bag, both ordered and unique are set to false, as the order of the members is of no significance and it may contain duplicate members. For Sequence, ordered is set to true, but unique is set to false, as the order is of relevance, while duplicate members may occur. For Alternative, ordered is set to false, while unique is set to true. As all alternatives are equivalent, order is of no relevance, and duplicates make no sense in this context.

RDF collections are based on the principle of a Linked List, i.e., every non-empty list can be split into the first element and the rest of the list. The rest of the list can either be split in this way as well, or it is an empty list, i.e., the "end" of the list. RDF provides the properties rdf:first and rdf:rest, as well as a predefined resource with the URI rdf:nil for the purpose of constructing an RDF collection. As it is not possible to append new elements at the end of the list by adding triples without introducing inconsistencies, this type of list is considered to closed.

The closedness of a list is of importance in regards to the Open World Assumption. As RDF(S) is based on this assumption, it is necessary to be able to express that a collection comprises all possible elements and that outside this collection, no further possible elements exist. The distinction between open and closed list is significant when reasoning over RDF(S) ontologies. In Ecore, on the other hand, reasoning is of no relevance. Furthermore, a closed world is assumed in the Ecore context, i.e., at any point in time, the list is assumed to be closed. Thus, the only additional information that we can exploit for the transformation is that for the resulting EStructuralFeature, ordered has to be set to true, and unique to false.

While RDF(S) does not allow to make statements about other statements (i.e., the object of a triple is again a triple), it provides the predefined properties rdf:subject, rdf:predicate, rdf:object and the predefined class rdfs:Statement as a workaround for this limitation. The statements constructed by this means are "propositions", with no semantic impact, i.e., no assertion is done by such statements. By definition, the referenced subjects, predicates and objects are resources in the ontology. As these resources might very well be properties (this is to be expected especially in the case of the predicate), there is no way to transform these propositions by applying the above described transformation process, as this would require properties as first-class citizens. As a workaround we propose the following solution: When such propositions occur in an ontology, a class rdfs2ecore:Statement is created in the Ecore model. This class contains the EAttributes subject, predicate and object of type EString with cardinality=1. For every proposition, an instance of this class may be created, and the values of the EAttributes may be set to the according IRI. This mechanism is optional; the software engineer can choose to ignore these propositions.

Additionally, in our transformation, the software engineer can decide to convert a proposition to an assertion, i.e., adding the predicate as an EStructuralFeature to the class representation of the subject and setting the value according to the object.

RDF(S) provides a set of predefined property names, by means of which additional information can be attached to resources in an RDF(S) document. This additional information has no semantic impact, but is supposed to provide further information in a human-readable way.

rdfs:label may be used to attach a label to a resource, which can then be used, e.g., to be displayed instead of the resource's less readable URI when visualizing the RDF document as a graph; rdfs:comment allows to assign human-readable comments to resources; rdfs:seeAlso and rdfs:isDefinedBy can be used to link one resource to other resources that might provide further information about the subject resource.

The range of rdfs:label and rdfs:comment is rdfs:Literal; the range of rdfs:seeAlso and rdfs:isDefinedBy is rdfs:Resource; as rdfs:Resource can be represented by an URI, all four values can be put into character strings on the Ecore side.

The additional information attached to an rdfs:Resource may therefore be transformed as follows:

To the class and property representations (which are of type EClass and EStructuralFeature) of a resource (if such a representations are required) we may add the EAnnotation:

| | |
|---|---|
| Source | = "http://www.sap.com/sw2ecore#ontologyAnnotations" |
| Key | = "label_<i>" // with i ∈ 1..n |
| Value | = ... // the value of the i-th rdfs:label property for this resource |
| Key | = "comment_<i>" // with i ∈ 1..n |
| Value | = ... // the value of the i-th rdfs:comment property for this resource |
| Key | = "seeAlso" |
| Value | = ... // the values of the rdfs:seeAlso property for this resource as URIs, separated by spaces |
| Key | = "isDefinedBy" |
| Value | = ... // the values of the rdfs:isDefinedBy property for this resource as URIs, separated by spaces |

As rdfs:isDefinedBy is meant to be a subproperty of rdfs:seeAlso, the values of rdfs:seeAlso may contain all the values of rdfs:isDefinedBy.

The representation of instances in Ecore is not part of the modeling concepts; they are merely instances of instances of an EClass in Ecore. As such, there is no predefined way to attach annotations to them like the above mentioned EAnnotations for class and property representations. To circumvent this restriction, we may add an unbounded EAttribute "additionalInformation" of type EStringToStringMapEntry to the common superclass Thing. We can then add the following key-value-pairs to this EAttribute (analogously to the EAnnotation specified above):

| | |
|---|---|
| Key | = "label_<i>" // with i ∈ 1..n |
| Value | = ... // the value of the i-th rdfs:label property for this resource |
| Key | = "comment_<i>" // with i ∈ 1..n |
| Value | = ... // the value of the i-th rdfs:comment property for this resource |
| Key | = "seeAlso" |
| Value | = ... // the values of the rdfs:seeAlso property for this resource as URIs, separated by spaces |
| Key | = "isDefinedBy" |
| Value | = ... // the values of the rdfs:isDefinedBy property for this resource as URIs, separated by spaces |

The present disclosure is also relevant to the transformation of OWL modeling primitives to Ecore. One aim of the transformation from OWL to Ecore is to be as adjustable as possible without burdening the software engineer with the need to delve into the details of OWL, description logic and reasoning. Another goal is to make the transformation process easily repeatable, so changes to the original model, i.e., the ontology, do not entail a lot of manual adjustments on behalf of the software engineer. Hence, we propose to extend the original transformation from OWL to Ecore with the possibility to exclude specific classes from the transformation as specified by the software engineer.

As stated above for the transformation from RDF(S), the class hierarchy of an ontology might contain classes which are of no interest for the model in the Ecore world. In order to enable the engineer to repeatedly apply the transformation without having to erase the respective classes each time by hand, with this extension, he can specify for each class if he wants to retain it for the transformation or not. If he decides to omit a class, all its subclasses will not be transformed either. This applies as well for individuals which are members of one or more of the omitted classes, and for properties whose range or domain class is omitted.

OWL allows multiple class membership for individuals, even if these classes are not in a sub- or super-class relationship. As stated above for the transformation from RDF(S) to Ecore, this behavior is not supported in Ecore, and renders the introduction of helper classes necessary.

An equivalence relation on the set of individuals is defined, and a subgraph of the inheritance graph (i.e., the class hierarchy) for each resulting equivalence class is constructed.

This is used to determine the number and the location of the necessary helper classes, which are simply defined as a subclass of the bottom classes of each subgraph, with the term "bottom classes of a graph" referring to classes which do not have subclasses themselves.

We propose to apply the improvement introduced for the transformation from RDF(S) to Ecore as well to the transformation from OWL to Ecore. The improvement consists of exploiting the fact that when an inheritance subgraph of an equivalence class has only one bottom class, the individuals in question can be transformed directly to instances of this bottom class, omitting no additional helper class.

When modeling relations between classes, e.g., individuals in OWL via object or data properties, it is possible that the modeler does not specify the domain and/or the range of such a property. This may be intentional or due to negligence. In OWL, the domain and range for such properties is implicitly assumed to be owl:Thing. The OWL to Ecore (OWL2Ecore) transformation may therefore add the associated EReference to the EClass corresponding to owl:Thing, which, while formally correct, might not be the desired behavior even in the case of intentional omission.

To circumvent this behavior, we propose an extension of the OWL2Ecore transformation. In case that domain and/or range of a property is owl:Thing, the transformation can either be continued "as is" without modification, or the classes for range and domain can be specified. If the ABox is part of the transformation, the types of the individuals associated with the property in question can be taken into account to determine the type of domain and range:

- domain and range can be set to the "lowest" common supertype of the above types. If this is owl:Thing, nothing is done.
- One of the common supertypes can be used. Again, if the only available supertype is owl:Thing, no change is performed.
- Alternatively, helper classes can be created. A helper class can be generated as supertype of all concerned types. A helper class can be generated as supertype of a subset of the concerned types.

If the ABox is not part of the transformation, the classes for domain and range can be chosen freely. In addition, it is possible to specify more than one domain and range pair; the property will then be transformed as multiple EStructuralFeatures (one for every pair).

However, this extension introduces several transformation problems due to which the possibility to specify or deduce domain and range should be used with caution:

- OCL may be used to preserve information on class membership induced by so-called class descriptions. By bending containing classes and types of EStructuralFeatures as described above, domain and range given in these class description no longer match the Ecore model and may render the generated OCL constructs invalid. In this case, the information obtained from the class descriptions will be lost, and the corresponding OCL expressions will be discarded.
- The integrity of the property hierarchy can no longer be guaranteed. Again, this information will not be preserved in this case.
- If the above extension is used on pairwise-disjoint properties, it is possible that the disjointedness cannot be maintained in the Ecore model.
- The same problem arises for properties which have an opposite property. This quality may not be preserved, if domain and range are not adjusted accordingly for both properties.

Same individuals (i.e., individuals whose equivalence can be inferred or is explicitly asserted) may be transformed as distinct instances of their associated types. The "sameness" of these instances was provided by a reference to all equivalent instances. While this is a perfectly valid way to preserve the information from the ontology, the resulting Ecore model would be inefficient and difficult to handle:

- Same individuals in an ontology share all qualities by definition. Any modification of one individual affects every other individual which is declared equivalent. In Ecore, objects are different by default. For instance, they are allocated to different memory addresses. Any change to one object would not be reected in any other object. Ecore itself does not provide any facilities to handle "same" objects. The same holds true for OCL.
- The only additional information provided by same individuals lies in their IRI. This information is a concept which is already foreign to the Ecore world. Creating distinct objects has no reasonable advantage when this information could be preserved in a much simpler and efficient way.

We propose the following solution:

- For a group of same individuals, only one representative is transformed, similar to the transformation of classes and properties.
- A multi-valued EAttribute of type EString is attached to the common top-level class Thing. For each same individual, the IRI of this individual is added as a value of this EAttribute.

Ecore offers functionality to validate models. In addition to the improvements of the constraints themselves, we propose to use the convention for validation delegates when embedding OCL constraints in Ecore classes. The constraints will then be treated as invariants for the annotated class. These invariants are verified each time model validation is performed.

In OWL (as well as in RDF(S)), properties are first-order citizens that form a hierarchy of binary relations. If an object property ex:hasUncle is a direct subproperty of an object property ex:hasRelative, every pair of individuals related by the object property ex:hasUncle is implicitly related by the object property ex:hasRelative due to the fact that ex:hasUncle is a subproperty of ex:hasRelative. By annotating the Ecore class Person (in package ex) corresponding to the domain of the property ex:hasUncle with the following OCL constraint, it is possible to verify if the above conditions regarding the property hierarchy are met by the current state of the Ecore model when validating the model.

```
ex : : Person . allInstances ( )->forAll ( a | a . hasRelative->
  includesAll ( a . hasUncle ) )
```

This applies to datatype properties as well. Given a datatype property pair ex:spouseName and ex:partnerName where ex:spouseName is direct subproperty of ex:partnerName, every literal connected to an individual by ex:spouseName is implicitly also connected to the same individual by ex:partnerName. This can be expressed by the following OCL constraint.

```
ex : : Person . allInstances ( )->forAll ( a | a . partnerName->
  includesAll ( a . spouseName ) )
```

In OWL, it is possible to make statements about the set of members of a class in several ways, viz. by enumeration of every member of the class in question, by restricting membership to individuals fulfilling certain conditions regarding one or more given properties or by applying set operations on the set of members of existing classes. Again, we can use OCL invariants to preserve the information induced by these so-called class descriptions.

The following assumption is true for most property restrictions:

Let us assume the property P with the domain class D to be restricted on the class A. Thus, A automatically becomes subclass of D through inference of the reasoner. After the transformation to an Ecore model, class A would already own an EReference P through inheritance from class D. In conclusion, it is necessary and sufficient to use OCL invariants attached to class A in the Ecore world to handle local restrictions.

However, there are cases of property restrictions, where A does not automatically become subclass of D. In the following OCL examples, these cases are noted.

```
AllValuesFrom with A=Person and P=hasPet:
ObjectAllValuesFrom( a:hasPet a:Dog )
Person . allInstances ( )->forAll (a | i f a . oclIsKindOf (PetOwner)
then ( a . oclAsType (PetOwner) . hasPet->asSe t ( )->
forAll (b | b . oclIsKindOf (Dog) ) ) else true endif )
```

In the case of AllValuesFrom, A is not classified as subclass of D by the reasoner, because A requires members to have either a dog or no pet at all. Individuals who have no pet at all are not necessarily members of D, so in the Ecore model, their corresponding classes would not own an EReference P. Because of this, members of A have to be have to be checked for their membership in D and cast to D when the check turns out positive. In OCL, this is achieved via the predefined functions oclIsKindOf and oclAsType.

```
SomeValuesFrom with A=Person and P=fatherOf :
ObjectSomeValuesFrom( a:fatherOf a:Man )
Person . allInstances ( )->forAll ( a | a . fatherOf->asSe t ( )->
exists (b | b . oclIsKindOf (Man) ) )
HasValue with A=AlexandersChildren and P=hasFather :
ObjectHasValue(a:hasFather Alexander)
AlexandersChildren . allInstances ( )->
collect ( x | x . hasFather )->
exists ( x | x . nameOfIndividual = ' Alexander ' )
HasSelf with A=AutoRegulatingProcess and P=regulate:
SubClassOf(:AutoRegulatingProcess ObjectHasSelf(a:regulate))
AutoRegulatingProcess . allInstances ( )->
forAll ( x | x . regulate->asSet ( )->includes ( x ) )
```

Similar to AllValuesFrom, MaxCardinality allows members with no parent at all, so the corresponding classes in the Ecore model might not own the EReference corresponding to P.

```
MaxCardinality with A=Person, P=hasParent and
D=PersonWithRelatives:
ObjectMaxCardinality( 2 a:hasParent )
Person . allInstances ( )->forAll ( a |
if a . oclIsKindOf ( PersonWithRelatives )
then a . oclAsType ( PersonWithRelatives ) . hasParent->
asSet ( )->size ( )<=2
else true endif )
```

This is not the case for the MinCardinality restriction.

```
MinCardinality with A=Person, P=hasNationality and D=Citizen:
ObjectMinCardinality(1 a: hasNationality)
people : : Person . allInstances ( )->forAll ( a | a . hasNationality->
asSet ( )->size ( )>=1)
```

An OWL class can be described by the means of union, intersection or complement of the set of members of other OWL classes.

```
UnionOf (in conjunction with AllValuesFrom) with A=Person,
P=hasRelative and D=PersonWithRelatives:
ObjectAllValuesFrom( a:hasRelative ObjectUnionOf( a:Woman a:Man))
Person . allInstances ( )->forAll ( a |
if a . oclIsKindOf ( PersonWithRelatives )
then ( a . oclAsType ( PersonWithRelatives ) . hasRelative->asSet ( )->
forAll (b | b . oclIsKindOf (Woman) or b . oclIsKindOf (Man) )
else true endif )
IntersectionOf and ComplementOf (in conjunction with AllValuesFrom)
with A=Person, P=hasYoungSister and D=PersonWithRelatives:
ObjectAllValuesFrom( a:hasYoungSister
ObjectIntersectionOf( a: Woman ObjectComplementOf( a:AdultWoman))
Person . allInstances ( )->forAll ( a |
if a . oclIsKindOf ( PersonWithRelatives )
then ( a . oclAsType ( PersonWithRelatives ) . hasYoungSister->
asSet ( )->forAll (b | b . oclIsKindOf (Woman)
and not b . oclIsKindOf (AdultWoman) )
else true endif )
```

An OWL class can be described by explicitly specifying every member of the class.

```
OneOf with A=Wine and P=hasColour:
ObjectAllValuesFrom(a:hasColourObjectOneOf(a:White a:Red))
Wine . allInstances ( )->collect ( x | x . hasColour )->forAll (y |
y . nameOfIndividual=' white ' or y . nameOfIndividual=' red ' )
```

Several "qualities" can be assigned to properties in OWL. The semantics of these so-called property characteristics can again be preserved in Ecore by using OCL invariants.

Functional and Inverse Functional Properties

If an object property P is functional, for each individual x, there can be at most one distinct individual y such that x is connected by P to y; if an object property P is inverse-functional, for each individual x, there can be at most one individual y such that y is connected by P with x.

```
Functional Property with P=hasParent, D=PersonWithRelatives
FunctionalObjectProperty(a:hasFather)
PersonWithRelatives . allInstances ( )->
forAll ( a | a . hasFather->asSet ( )->size ( )<=1)
InverseFunctionalProperty with P=fatherOf, D=PersonWithRelatives
InverseFunctionalObjectProperty(a:fatherOf)
PersonWithRelatives . allInstances ( )->forAll (x , y |
x . fatherOf->excludesAll ( y . fatherOf->asSet ( ) ) )
```

Symmetric and Asymmetric Object Properties

If an object property P is symmetric, for every pair of individuals x and y, if x is connected to y by P, y is also connected to x by P; if an object property P is asymmetric, for every pair of individuals x and y, if x is connected to y by P, y cannot be connected to x by P.

```
Symmetric Property with P=hasFriend, D=PersonWithFriends
SymmetricObjectProperty(a:hasFriend)
PersonWithFriends . allInstances ( )->
forAll (x , y | x . hasFriend->includes ( y )
implies y . hasFriend->includes ( x ) )
```

Asymmetric Property with P=fatherOf, D=Person
AsymmetricObjectProperty(a:fatherOf)
Person . allInstances ( )->forAll (x , y | x . fatherOf->includes ( y )
implies y . fatherOf->exclude s ( x ) )

Transitive Object Properties
If an object property P is transitive, for every triple of individuals x, y and z, if x is connected to y by P, and y is connected to z by P, then x is also connected to z by P.

Transitive Property with P=ancestorOf, D=PersonWithDescendants,
R=Person
TransitiveObjectProperty(a:ancestorOf)
PersonWithDescendants . allInstances ( )->
forAll ( x | PersonWithDescendants . allInstances ( )->
forAll ( y | Person . allInstances ( )->
forAll ( z | x . ancestorOf->includes ( y )
and y . ancestorOf->includes ( z )
implies x . ancestorOf->includes ( z ) ) ) )

Reflexive and Irreflexive Object Properties

OWL Assertion: ReexiveObjectProperty(a:anyProperty)
A. allInstances ( )->forAll ( x | x . anyProperty->includes ( x ) )
OWL Assertion: IrreexiveObjectProperty(a:anyProperty)
A. allInstances ( )->forAll ( x | x . anyProperty->excludes ( x ) )

Disjoint Properties
If two properties $P_1$ and $P_2$ are declared to be disjoint, an individual x cannot be connected to a distinct individual y by both properties $P_1$ and $P_2$ at the same time.

Disjoint Properties with $P_1$=hasFather, $P_2$=hasMother,
$D_1$=Person, $D_2$=Person
DisjointObjectProperties( a:hasFather a:hasMother )
Person . allInstances ( )->forAll ( a | a . hasFather->
excludesAll ( a . hasMother->asSet ( ) ) )

Several further axioms regarding properties exist in OWL that can be expressed in Ecore via OCL invariants. In the following paragraphs, comprehensive examples for these invariants are given.

Figure 14:
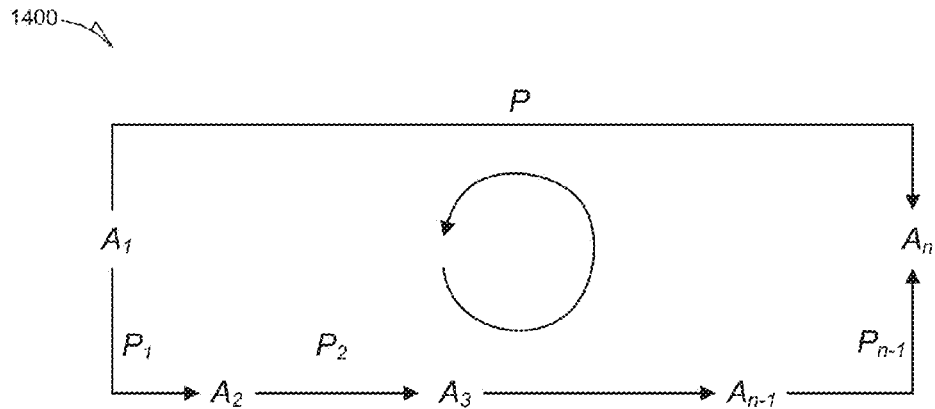
FIG. 14 illustrates a property chain, in accordance with an example embodiment.

Property Chains
Properties can be defined as a composition of other properties by means of so-called property chains. By defining an object property P as the chain of object properties $P_i$ (i∈1 . . . n), we state that any individual x connected with an individual y by this chain of object properties is necessary connected with y by the object property P. FIG. 14 illustrates the definition of property P by means of a property chain, in accordance with an example embodiment.

Property Chain with property P, domain A of P, properties $P_i$ in chain (i ∈ 1..n),
domain $A_i$ of $P_i$, range Ri of Pi
ObjectPropertyChain( P1 ... Pn )
A. allInstances ( )->forAll ( a1 | D1 . allInstances ( )->
forAll ( a2 | D2 . allInstances ( )->forAll ( ...
Dn . allInstances ( )->forAll ( an | Rn . allInstances ( )->
forAll ( an+1 | a1 .P1->includes ( a2 )
and a2 .P2->includes ( a3 ) and . . . an .Pn->includes ( an+1)
implies a1 .P->includes ( an+1 ) ) . . . ) )

Keys
Keys allow to specify that named instances of a class are uniquely identified by the value of one or more given properties, i.e., if the instances have the same value for each key property, then these instances must be identical.

HasKey with A=Person, P=hasSSN
HasKey( a:Person a:hasSSN )
Person . allInstances ( )->forAll (x , y | x . hasSSN->
excludesAll ( y . hasSSN->asSet ( ) ) )

Negative Property Assertion
A negative property assertion states that a specific individual is not connected to another specific individual or a specific literal by the given property. This is important in regards to the open world assumption of OWL, as otherwise the question if an individual is connected to another individual or literal by the property in question could not be answered with "no" even if no positive property assertion exists.

Negative Property Assertion with A=Man, P=hasWife
NegativeObjectPropertyAssertion( a:hasWife a:Bill a:Mary )
Man. allInstances ( )->
forAll ( x | x . NameOfIndividual=' Bi ll '
implies x . hasWife->asSet ( )->
forAll ( y | y . NameOfIndividual< >'Mary ' ) )

When modeling an ontology, individuals are often not declared differentFrom, sometimes even if the ontologist thinks of them as different, but does not explicitly assert the difference of these individuals. This may be due to negligence, but as the explicit assertion for every pair of individuals is a tedious task, it may just not be feasible for ontologies with a large amount of individuals. When transforming these individuals, they automatically become "different" objects in Ecore, but this may still prove to be a problem, as the information about the difference is not taken into consideration when performing reasoning on an ontology, i.e., when materializing implicit knowledge before the actual transformation. As a workaround, we propose the possibility to set all individuals as pair-wise different before the materialization of implicit knowledge, except those individuals which are asserted as equivalents of other individuals.

Figure 15:
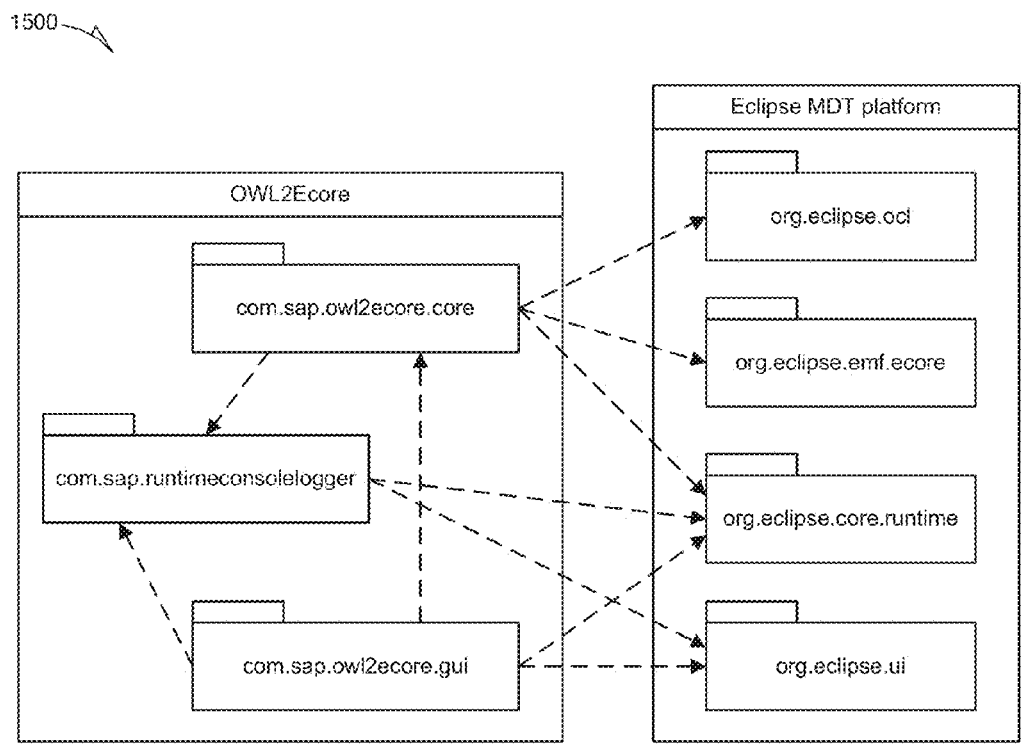
FIG. 15 illustrates a simplified plug-in dependency diagram, in accordance with an example embodiment.

The implementation of the transformation of a Semantic Web ontology into a software meta-model and model is discussed below. The ontology transformation module 620 may be implemented as a plug-in for the Eclipse Platform. The Eclipse platform forms the base of Ecore. FIG. 15 illustrates a simplified plug-in dependency diagram 1500 of the implementation, in accordance with an example embodiment.

The first implementation step may be the definition of a data model for the configuration options of our transformation. To allow an adjustable transformation, the model may be able to represent all possible configuration needs, all the while not encapsulating application logic and thus losing flexibility. The capability to save transformation decisions and to reapply these decisions on subsequent transformations may be achieved.

The data model may be created in Ecore by specifying the model using an XML Schema definition. This may be done for three reasons:

1. In order to use of EMF's persistence facilities with a serialization format tailored to our needs.
2. Due to the code generation facilities provided by EMF, a basic editor may be generated for our configuration files, allowing for instant creation and modification of transformation configurations.

3. Modifications and extensions of the configuration model are inexpensive due to automated code regeneration and merging.

A wizard-driven graphical user-interface may be employed in order to allow configuration of the most common use-cases. For a more specific configuration, the auto-generated config file editor can be used.

Figure 16:
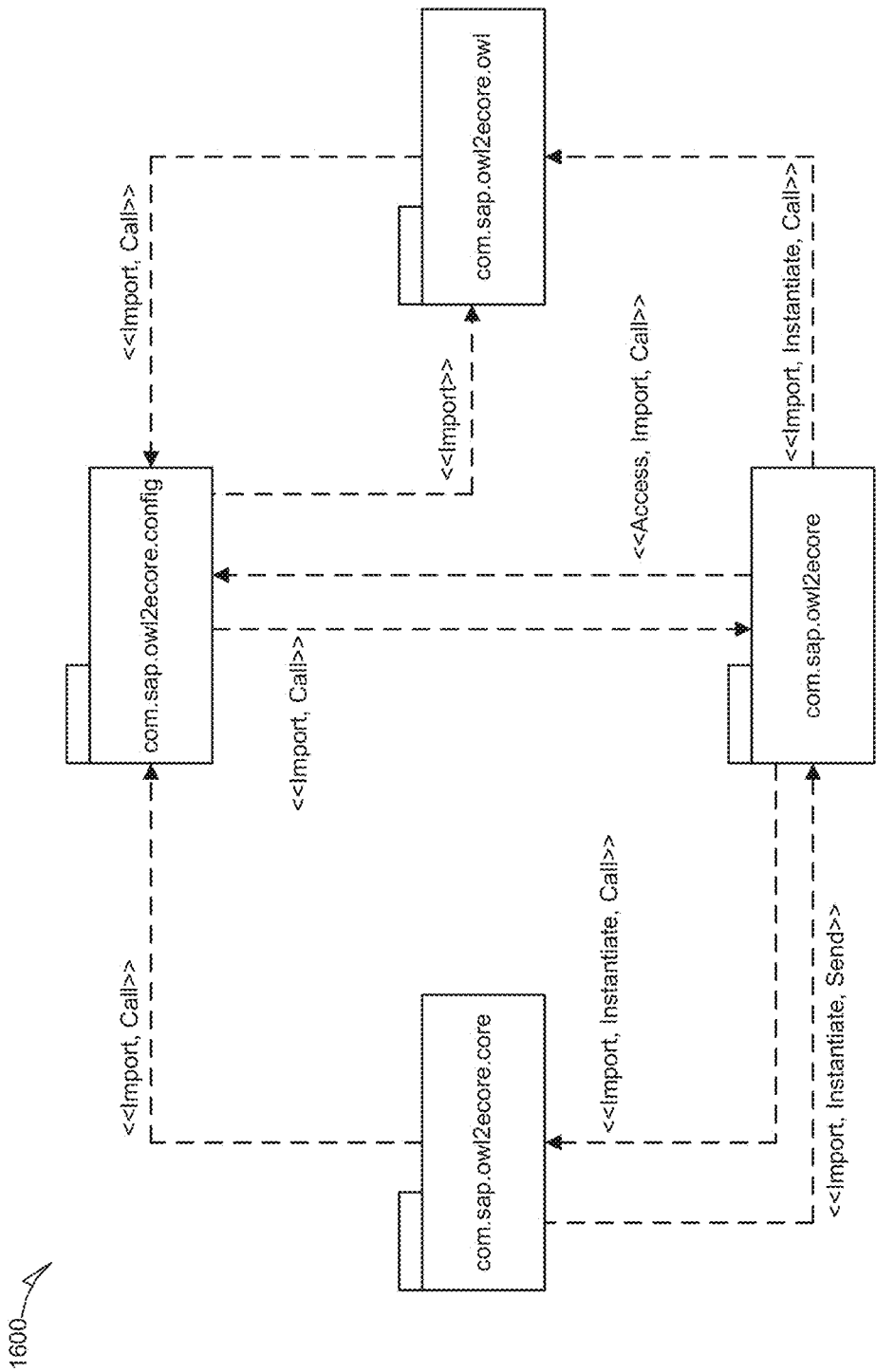
FIG. 16 illustrates a package dependency diagram, in accordance with an example embodiment.

FIG. 16 illustrates a package dependency diagram 1600 of the implementation, in accordance with an example embodiment. The implementation may be divided into several packages. Each of these packages may concentrate one specific aspect of the whole transformation process. The functionality provided by each of these packages is outlined below.

FIG. 17 illustrates a package structure 1700 of an implementation, in accordance with an example embodiment. In the base package, notable classes are OWL2EcoreMain and OWL2EcoreTransformation. OWL2EcoreMain provides a Java main method as well as the API to invoke the whole transformation from other applications (or plug-ins like the wizard-driven user interface described below). It may invoke ontology preparation, as well as the class OWL2EcoreTransformation. This class may provide the frame for the actual transformation.

FIG. 18 illustrates the composition of a config package 1800, in accordance with an example embodiment. The config package 1800 may contain the data model of the transformation. This model may be used to handle the configuration and the corresponding configuration files. The model may be an Ecore model and be specified via an XML Schema file. In consequence, this package may contain mainly auto-generated classes, except some classes in the util package and some manual modifications to the Config interface and its implementation.

Figure 19:
FIG. 19 illustrates the composition of an owl package, in accordance with an example embodiment.

FIG. 19 illustrates the composition of an owl package 1900, in accordance with an example embodiment. The owl package 1900 may contain all functionality related to the preparation of the ontology for a subsequent transformation. In this package, the necessary helper classes for anonymous classes, domains and ranges of properties and for individuals may be identified and added to a copy of the ontology (if not configured otherwise). Also, implicit knowledge, i.e., knowledge which is only implicitly manifested in the ontology and accessible via reasoning, may be materialized by adding explicit statements to the copied ontology.

Notable classes are OWLOntologyExtension, which is the package's main class and integrates the functionality of the other classes of this package to provide the behavior described above, and OWLOuterAnonymousClassWalkerVisitor, which allows to identify "maximal" anonymous classes, i.e., classes which are not part of another, nested anonymous class.

Figure 20:
FIG. 20 illustrates the composition of an ecore package, in accordance with an example embodiment.

FIG. 20 illustrates the composition of an ecore package 2000, in accordance with an example embodiment. The ecore package 2000 contains all the functionality related to the actual transformation. A rough outline of the transformation process may be as follows:
1. The class hierarchy is traversed and the corresponding classes are created in an Ecore (meta-)model via OWLEcoreClassHierarchyTransformator.
2. The object and data property hierarchies are traversed and the necessary attributes and references are created in corresponding classes by the classes OWLEcoreObjectPropertiesTransformator and OWLEcoreDataPropertiesTransformator. The Ecore metamodel is complete.
3. An iteration over the set of individuals is performed with the class OWLEcoreIndividualTransformator, the corresponding Ecore classes are instantiated and the references and attributes set to the correct values.

Another notable class is OCLGenerator, which uses nested anonymous class expressions as an abstract syntax tree for OCL constraint generation.

A wizard-driven graphical user interface may be provided for the transformation from OWL to Ecore as a separate Eclipse plug-in. Impressions of the user interface and explanations of the user interface controls are discussed below.

If the plug-in is installed correctly, a new item OWL2Ecore may be available in the main menu of the Eclipse IDE. The plug-in can be started by selecting this menu item and afterwards selecting Launch.

Figure 21:
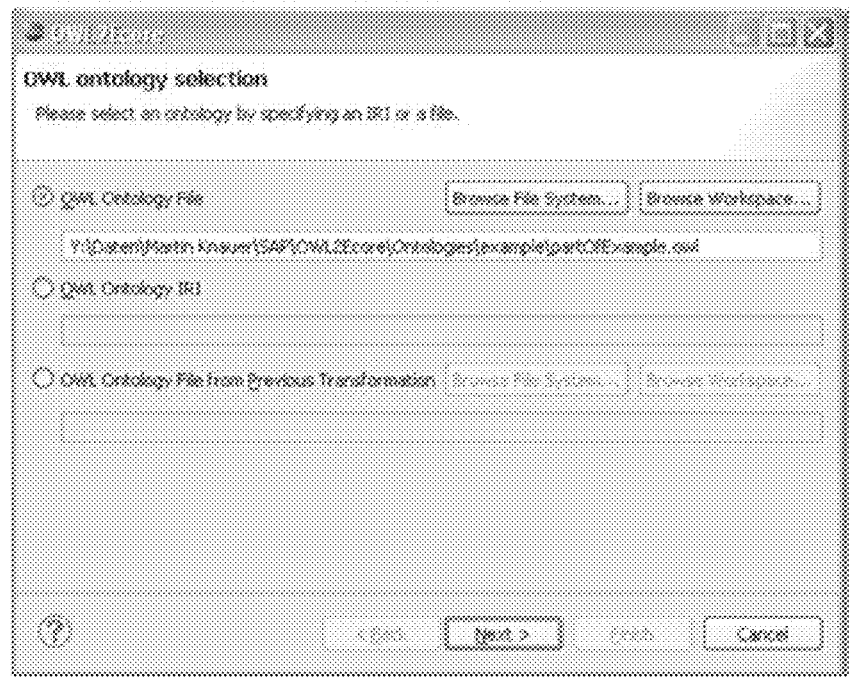
FIG. 21 illustrates a graphical user interface for specifying an OWL ontology, in accordance with an example embodiment.

The first dialog which may be displayed to the user is an ontology selection dialog. FIG. 21 illustrates a graphical user interface 2100 for specifying an OWL ontology, in accordance with an example embodiment. An OWL Ontology File setting may allow the user to specify a local file which contains the ontology. Ontologies that compose the import closure of the selected ontology may be available either remotely under their IRI or locally in the same directory. An OWL Ontology IRI setting may allow the user to specify an IRI under which the ontology can be retrieved remotely. If the specified ontology is already a fully extended ontology, e.g., when using intermediate ontology files from previous transformations, an OWL Ontology File from Previous Transformation setting can be used to save time. In some embodiments, no ontology preparation and extension (i.e., no ontology classification and no materialization of implicit knowledge) is performed in this case; instead, the transformation is performed immediately.

Figure 22:
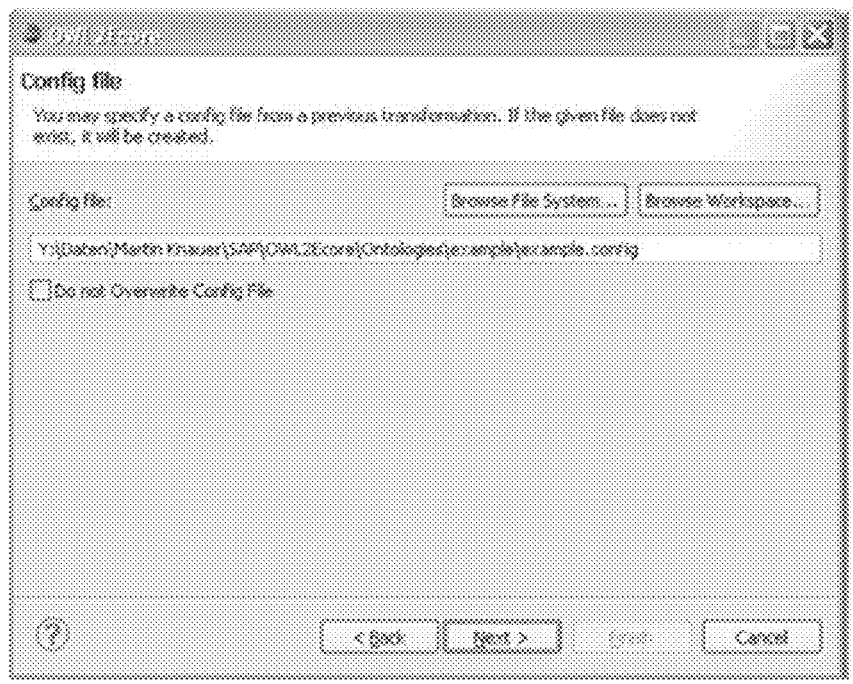
FIG. 22 illustrates a graphical user interface for specifying a configuration file, in accordance with an example embodiment.

After having chosen the ontology which is to be transformed, either a new configuration file may be created or an existing one selected. FIG. 22 illustrates a graphical user interface 2200 for specifying a configuration file, in accordance with an example embodiment. A Config file setting may allow the user to specify a configuration file. If the current ontology is transformed for the first time and no configuration file exists, a new one may be created at the given location. If no location or an invalid one is specified, the configuration may not be saved. If a Do not Overwrite Config File setting is selected, an existing config file can be specified, but any subsequent changes of the configuration in the following dialogs will not be written to this file. This may be used for testing purposes without risking to lose a previously "well-tended" configuration.

Figure 23:
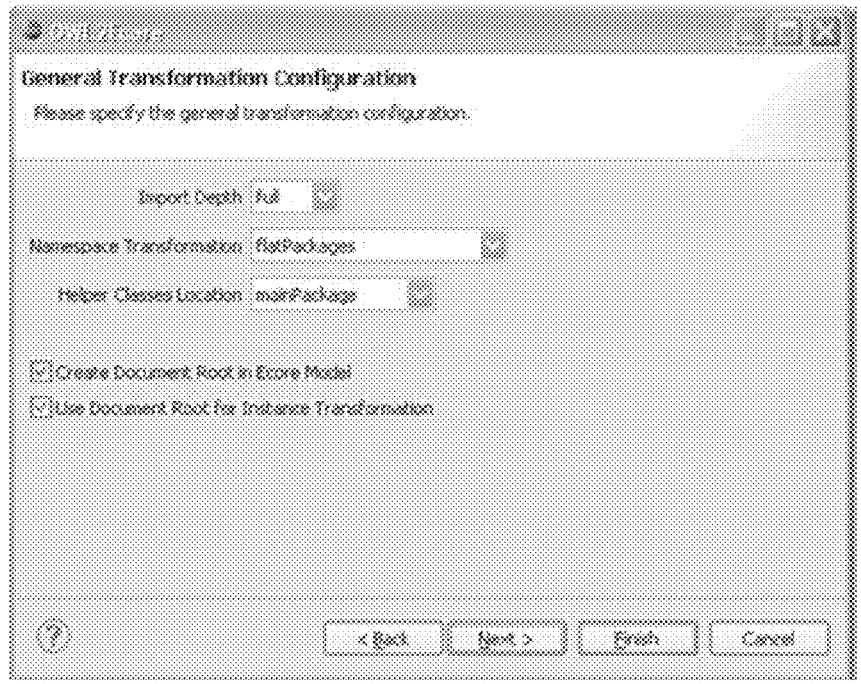
FIG. 23 illustrates a graphical user interface for specifying general transformation settings, in accordance with an example embodiment.

FIG. 23 illustrates a graphical user interface 2300 for specifying general transformation settings, in accordance with an example embodiment. In this dialog, the settings which are relevant for the transformation as a whole rather than for distinct entities can be specified. Import Depth may specify to which point the OWL entities of the import closure are carried over to the Ecore model. An explanation of the possible values can be found below. Namespace Transformation may specify in which way namespaces are transformed. An explanation of the possible values can be found below. Helper Classes Location may specify in which package helper classes are placed. Helper classes are classes, which are not explicitly present in the original ontology, but are necessary in the Ecore model to transform certain concepts, e.g., individuals which belong to multiple distinct branches in the class hierarchy. An explanation of the possible values can be found below. A Create Document Root in Ecore Model setting may enable the generation of a model root element which owns containment references to all transformed classes, so instances can easily be created and used via the generated EMF editors. A Use Document Root for Instance Transformation setting may specify if the transformed individuals are attached to the above root element, so they can be easily viewed and modified via the generated EMF editors.

Figure 24:
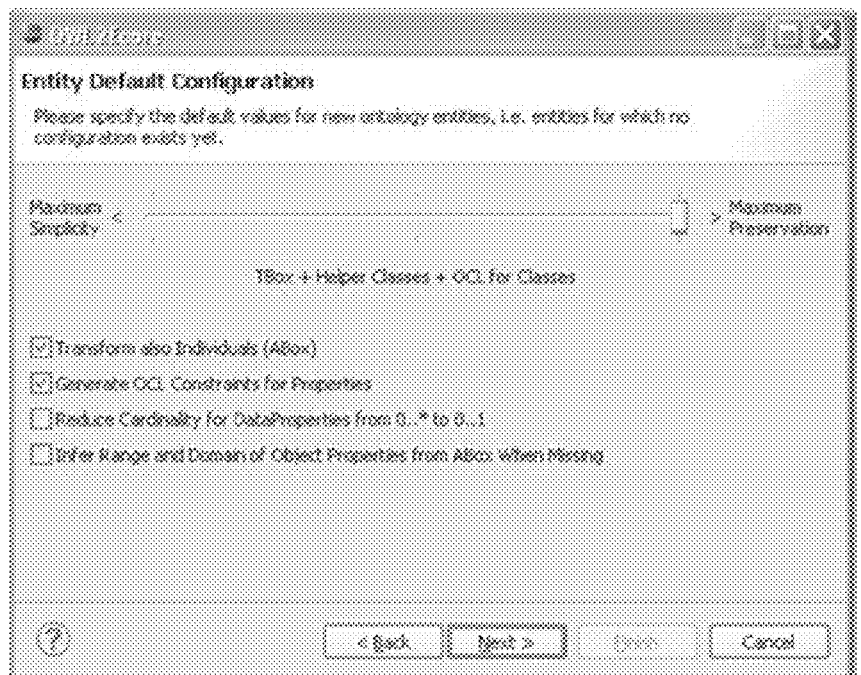
FIG. 24 illustrates a graphical user interface for specifying default settings for distinct entities, in accordance with an example embodiment.

FIG. 24 illustrates a graphical user interface 2400 for specifying default settings for distinct entities, in accordance with an example embodiment. This dialog may allow users to specify the default settings for the ontology's entities. As long as all entities still use the default settings, any modification on this dialog affects all entities. As soon as individual settings are applied (e.g., by modification of the configuration file via the auto-generated editor), any modification on this dialog may affect only entities for which no configuration values from a previous transformation were found. In this case, an additional checkbox may be displayed which allows to override this behavior, so the settings of this dialog can be applied to all entities (while risking to lose manual modifications to the configuration file).

In some embodiments, if the slider is set to an Only TBox, no Helper Classes, no OCL for Classes position, no helper classes will be created and no OCL constraints will be generated from OWL class descriptions. In some embodiments, if the slider is set to a TBox+Helper Classes, but no OCL for Classes position, helper classes will be created, but no OCL constraints will be generated from OWL class descriptions. In some embodiments, if the slider is set to a TBox+Helper Classes+OCL for Classes position, helper classes will be created and OCL constraints will be generated from OWL class descriptions. With a Transform also Individuals (ABox) setting, it may be possible to transform the individuals of the ontology to instances in Ecore. A Generate OCL Constraints for Properties setting may enable the generation of all property related OCL constraints. A list of the different constraint types can be found below. Regarding a Reduce Cardinality for DataProperties from 0..* to 0..1 setting, if no explicit cardinality restrictions are given for a property, it may be assumed to be 0..* in OWL. By enabling this setting, 0::1 may be used instead. Regarding an Infer Range and Domain of Object Properties from ABox When Missing setting, if no domain and/or range was specified for an object property, domain and range may be assumed to be Thing. By enabling this setting, the domain and range may be set to the lowest common supertype (lowest in the sense of the class hierarchy) of all corresponding individuals.

OCL constraints for anonymous class expressions may have to be dropped because the corresponding reference in Thing is not available any more. OCL constraints for disjointedness of properties may have to be dropped as well due to incompatible lowest common supertypes. In this case, disjointedness may be naturally provided by the incompatibility of these types.

Figure 25:
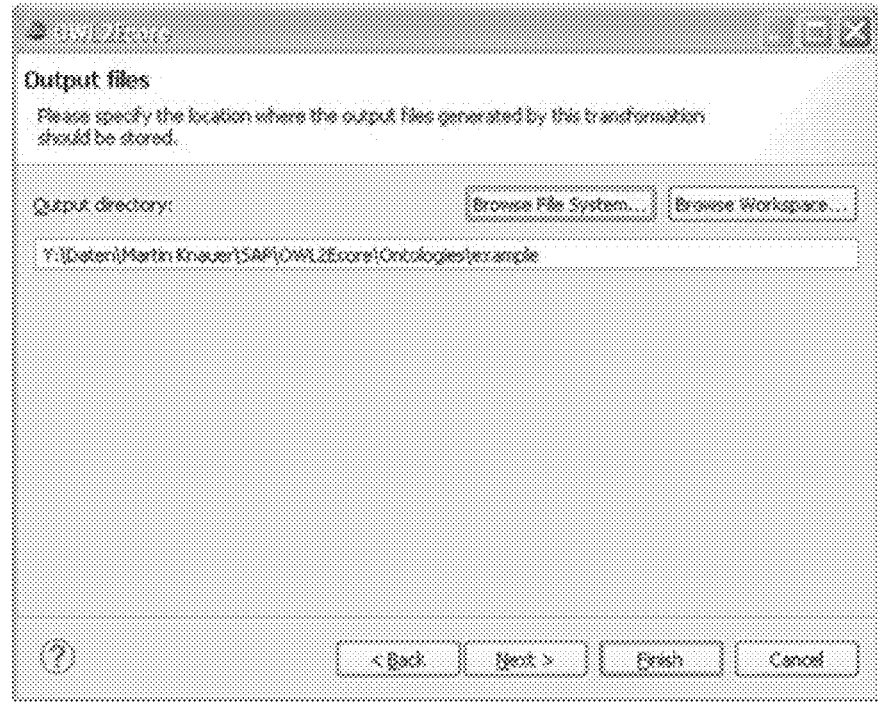
FIG. 25 illustrates a graphical user interface for specifying an output directory, in accordance with an example embodiment.

FIG. 25 illustrates a graphical user interface 2500 for specifying an output directory, in accordance with an example embodiment. In this dialog, the output directory can be specified. The results of the transformation may be written to this directory. Two files may be written to the specified directory. One file may hold the Ecore metamodel containing the result of the transformation of the TBox; the other file may hold the Ecore model (i.e., an instance of the Ecore metamodel) containing the result of the transformation of the ABox. In some embodiments, the second file will not be generated if the ABox is not transformed.

Figure 26:
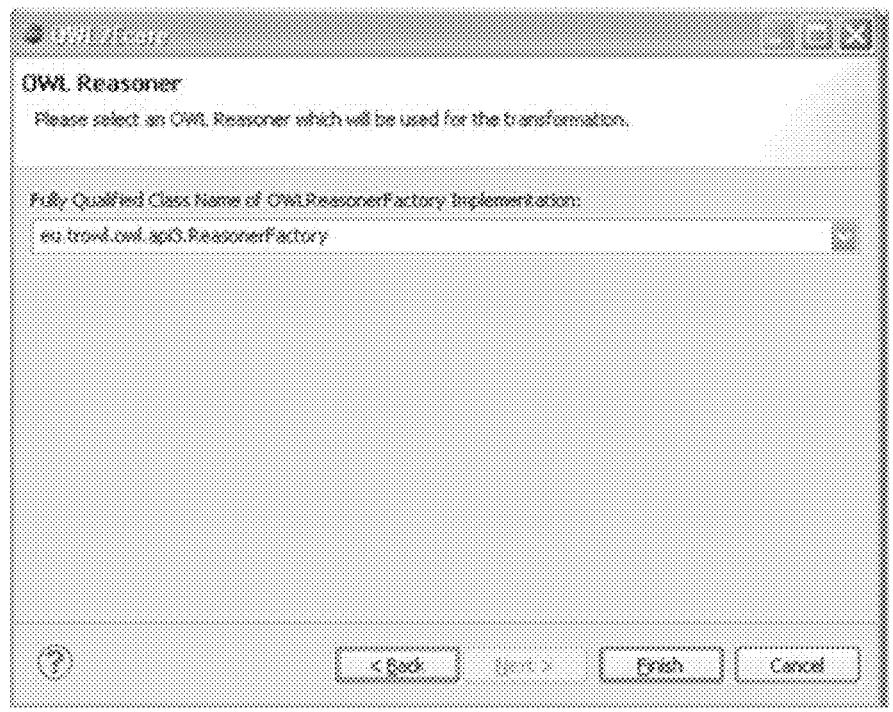
FIG. 26 illustrates a graphical user interface for specifying a reasoned for the transformation, in accordance with an example embodiment.

FIG. 26 illustrates a graphical user interface 2600 for specifying a reasoned for the transformation, in accordance with an example embodiment. In this dialog, the reasoner for the transformation can be selected or specified. By default, several currently existing reasoner solutions may be looked up on the class path and provided for selection when found. It is also possible to provide further reasoner solutions. To do so, the corresponding libraries may be put into an Eclipse fragment plug-in and exposed in the runtime classpath of the fragment plug-in. The ID of the host plug-in may be com.sap.owl2ecore.core. If the fully qualified name of a class implementing the OWLReasonerFactory interface of the OWL API 3 is supplied, and this implementation is found in the classpath, this reasoner may be used for the transformation. By default, the plug-in may look for several currently existing reasoner solutions and provide the ones which were found in the drop-down list of this control.

Configuration options which can be specified in the configuration file are discussed below. The configuration file may be a hierarchically structured XML file. For better readability a "flat" representation may be chosen. The configuration file can be edited with standard text or XML editors, but an auto-generated EMF editor may also integrated in the plug-in.

One type of configuration option may be general options, which may designate all settings which are relevant for the transformation as a whole rather than for distinct entities. Examples of general options include the following:

importDepth
    Specifies to which point the OWL entities of the import closure are carried over to the Ecore model.
Possible values:
none Only entities which are referenced in the base ontology are considered.
direct Additionally to the entities from setting "none", all entities referenced in the ontologies specified in the import closure are transformed.
full Every single entity of the whole import closure is carried over.
namespaceTransformation
    Specifies in which way namespaces are transformed.
Possible values:
flat_packages
    For every namespace, an Ecore package will be created on the top level of the package structure, so no package hierarchy will be established.
nested_packages
    This setting takes the path-component of the namespace's IRI into consideration, so if the IRI of namespace A points to a sub-path of namespace B, the EPackage created for A will be a subpackage of the EPackage for B. Example: namespace util with IRI http://www.sap.com/owl2ecore/util# and namespace helper with IR http://www.sap.com/owl2ecore/util/helper# will lead to EPackages util and util.helper.
class_name_suffix
    With this setting, the creation of EPackages is omitted. Instead, the namespace prefix is appended to the name of the EClass in the Ecore model, separated by an underscore "_", e.g., Thing owl.
class_name_suffix_on_conflict
    Just like for "class name suffix" (see above), the creation of EPackages is omitted. But the namespace prefix is appended to the name of the EClass in the Ecore model only if another class with the same name exists.
locationOfHelperClasses
    Specifies in which package helper classes are placed. Helper classes are classes, which are not explicitly present in the original ontology, but are necessary in the Ecore model to transform certain concepts, e.g., individuals which belong to multiple distinct branches in the class hierarchy.

Possible values:
  main_package The helper classes are placed in the ontology's principal Ecore package along with the other classes.
  separate_package An EPackage is created specially for the helper classes. In this case, a namespace can be provided which will be used for the package creation (see below).
helperClassesPackageNamespace
Specifies to which point the OWL entities of the import closure are carried over to the Ecore model.
Possible values:
  A namespace definition
documentRoot
Allows for the generation of a model root element which owns containment references to all transformed classes and (optionally) individuals, so instances can easily be created and used via the generated EMF editors.
Subvalues:
package The location of the document root in the Ecore model.
  Possible values:
    A namespace definition
name The name of the document root in the Ecore model.
  Possible values:
    Any character string
useForTBox Specifies if the document root is generated at all.
  Possible values:
    boolean
useForABox Determines if the document root (if generated via useForTBox=true) is used for the transformation of the existing individuals.
  Possible values:
    boolean
setDifferentFromForIndividuals
Specifies if "DifferentIndividuals"-axioms are to be generated for every pair of individuals which are not defined to be "SameIndividuals" or already "DifferentIndividuals". This can be used to bring the unique name assumption of the Ecore world to OWL. Unfortunately, some reasoners (Pellet as of version 2.2.2, HermiT as of version 1.3.0) do not handle this very well.
Possible values:
  boolean Another type of configuration option may be classes, which may have associated XML elements: namedClass, anonymousClass. It is possible to specify distinct transformation options for every single class. Configuration wise, classes are separated into named classes (any class explicitly defined and identified by an IRI) and anonymous classes (implicit classes which were materialized when preparing the transformation; these classes are identified by an auto-generated IRI based on hash values, so every class can be re-identified on a subsequent transformation), but currently they do not differ in available configuration options. Examples of class options include the following:
  id
  The IRI of the class to which the following transformation options will be applied. In case of named classes, this IRI is the IRI found in the ontology, in case of an anonymous (implicit) class, this IRI is auto-generated by hashing the class.
Possible values:
Any character string
retained
  Specifies if this class is to be carried over into the Ecore model or if it should be omitted. Only one representative class of a group of equivalent classes can be retained. Omitting a class means that no associated property or individual can be transformed.
  Possible values:
    boolean
  name
  Specifies the name which is used for the class in the Ecore model. This is generally automatically set to the fragment1 of the class's IRI. This setting is especially useful for assigning meaningful names to anonymous classes.
  Possible values:
    Any character string
  ocl.ClassExpressions
  Specifies if anonymous classes, which are used as equivalent classes, super classes or class restriction for this class, should be translated into an OCL constraint and added as an EAnnotation.
  Possible values:
    boolean Another type of configuration option may be properties, which may have associated XML elements: objectProperty, dataProperty. Again, transformation options can be specified for every single property. Object properties and data properties share certain options, but both have their unique set of options as well.

The following transformation options may apply to object properties, as well as to data properties:
  id
  The IRI of the property to which the following transformation options will be applied.
  Possible values:
  Any character string
  retained
  Specifies if this property is to be carried over into the Ecore model or if it should be omitted.
  Possible values:
    boolean
  name
  Specifies the name which is used for the property in the Ecore model. This is generally automatically set to the fragment2 of the property's IRI.
  Possible values:
    Any character string
  subPropertyRelation
  This setting allows to specify several options related to subproperty relations for each superproperty separately. In consequence, multiple entries for subPropertyRelation per property are possible.
  Subvalues:
    superProperty
      The ID of a the superproperty, i.e., its IRI.
      Possible values:
        Any character string
    ocl.SubPropertyRelation
      Specifies if the super-/subproperty relationship between two properties should make its way into the Ecore model via an OCL constraint.
      Possible values:
        boolean
  ocl.FunctionalProperty
  Specifies if the "functional" characteristic of an property should be expressed in the model by an OCL constraint.

Possible values:
  boolean
ocl.DisjointProperties
Specifies if the disjoint property relationship between two properties should make its way into the Ecore model via an OCL constraint.
Possible values:
  boolean
ocl.Keys
Specifies if the fact that an property is declared as key of a class expression should be reflected in the Ecore model by an OCL constraint.
Possible values:
  boolean
ocl.NegativePropertyAssertion
Specifies if negative property assertions for this property should be expressed in the Ecore model by an OCL constraint.
Possible values:
  boolean
Object properties may have associated XML element: objectProperty. The following transformation options may apply only to object properties:
pushDown
  This setting allows for a property to be pushed down to subclasses if no domain and/or range was specified, i.e., domain and range are implicitly Thing. The default push down behaviour is to set the domain and range to the lowest common supertype (lowest in the sense of the class hierarchy) of all corresponding individuals. Custom domain and range settings can be made via customPushDown entries. OCL constraints for anonymous class expressions may have to be dropped because the corresponding reference in Thing is not available any more. OCL constraints for disjointness of properties may have to be dropped as well due to incompatible lowest common supertypes. In this case, disjointness is naturally provided by the incompatibility of these types.
  Possible values:
    Boolean
customPushDown
  If pushDown is enabled (see above), these entries allow to specify to which classes this property should be pushed down, and which type the pushed down reference is supposed to have. These entries are optional, if none are given, a default push down behaviour is performed (i.e., lowest common supertype). Should be used with care, as references from one instance to another may easily be rendered untransformable and hence be lost.
  Subproperty relations via OCL will be discarded. In addition, a custom push down for the inverse property must be established as well in order to maintain the opposite reference relation.
  Subvalues:
    domain Specifies the domain of the pushed down reference, i.e., the class to which the reference should be pushed down.
      Possible values:
        An IRI
    range Specifies the range of the pushed down reference, i.e., the type of the pushed down reference.
      Possible values:
        An IRI
ocl.InverseFunctionalProperty
Specifies if the inverse functional characteristic of an object property should be expressed in the model by an OCL constraint.

Possible values:
  Boolean
ocl.SymmetricProperty
Specifies if the symmetric characteristic of an object property should be expressed in the model by an OCL constraint.
Possible values:
  boolean
ocl.AsymmetricProperty
Specifies if the asymmetric characteristic of an object property should be expressed in the model by an OCL constraint.
Possible values:
  boolean
ocl.TransitiveProperty
Specifies if the transitive characteristic of an object property should be expressed in the model by an OCL constraint.
Possible values:
  Boolean
ocl.ReflexiveProperty
Specifies if the reexive characteristic of an object property should be expressed in the model by an OCL constraint.
Possible values:
  boolean
ocl.IrreflexiveProperty
Specifies if the irreexive characteristic of an object property should be expressed in the model by an OCL constraint.
Possible values:
  boolean
ocl.PropertyChains
Specifies if property chains which form a subproperty for this property should be expressed in the Ecore model by an OCL constraint.
Possible values:
  Boolean
Data properties may have associated XML element: dataProperty. The following transformation options may apply only to data properties:
cardinality
  If no explicit cardinality restrictions are given for a property, this parameter can be used to override the default setting which is 0..* in OWL, but is supposed to be 0..1 in many cases. This can be helpful, when the creator of the ontology didn't consider the 0..* default. Only cardinality restrictions on the domain class can be expressed directly in Ecore and are thus used to determine the relevance of this setting. Any other cardinality restriction can only be expressed by OCL and are not taken into consideration here.
  Possible values:
    reduce 0..1 is used.
    remain 0..* is used.
datatype
  Specifies the datatype which should be used in the Ecore model for this data property, if a different datatype than the one from the ontology is desired. A full IRI has to be given, e.g., http://www.w3.org/2001/XMLSchema#int. It is recommended to use the predefined XML Schema simple types.
  Possible values:
    An IRI
Individuals may have associated XML elements: namedIndividual, anonymousIndividual. As for classes and properties, it is possible to specify distinct transformation options for every single individual. Named and anonymous individuals may be separated configuration wise, but currently they may not differ in available configuration options.

id

The identifier of the individuals to which the following transformation options will be applied. In case of named individuals, this is the individual's IRI, in case of an anonymous individual, this is the node ID.

Possible values:

Any character string retained

Specifies if this individual is to be carried over into the Ecore model for instances. Only one representative individual of a group of equivalent individuals can be retained.

Possible values:

boolean

Namespaces may have associated XML element: namespace. The prefix of a namespace may be used as name of an EPackage, when separate packages are to be created. This entry may allow users to redefine a prefix specified in the ontology or to define it in the first place in the case of namespaces which do not have a prefix assigned. This element can also be used inside other settings which require the specification of a namespace.

iri

The IRI of the namespace whose prefix is to be (re-)defined.

Possible values:

An IRI prefix

The actual prefix which will be used as package name in the Ecore model.

Possible values:

Any character string

Figure 27:
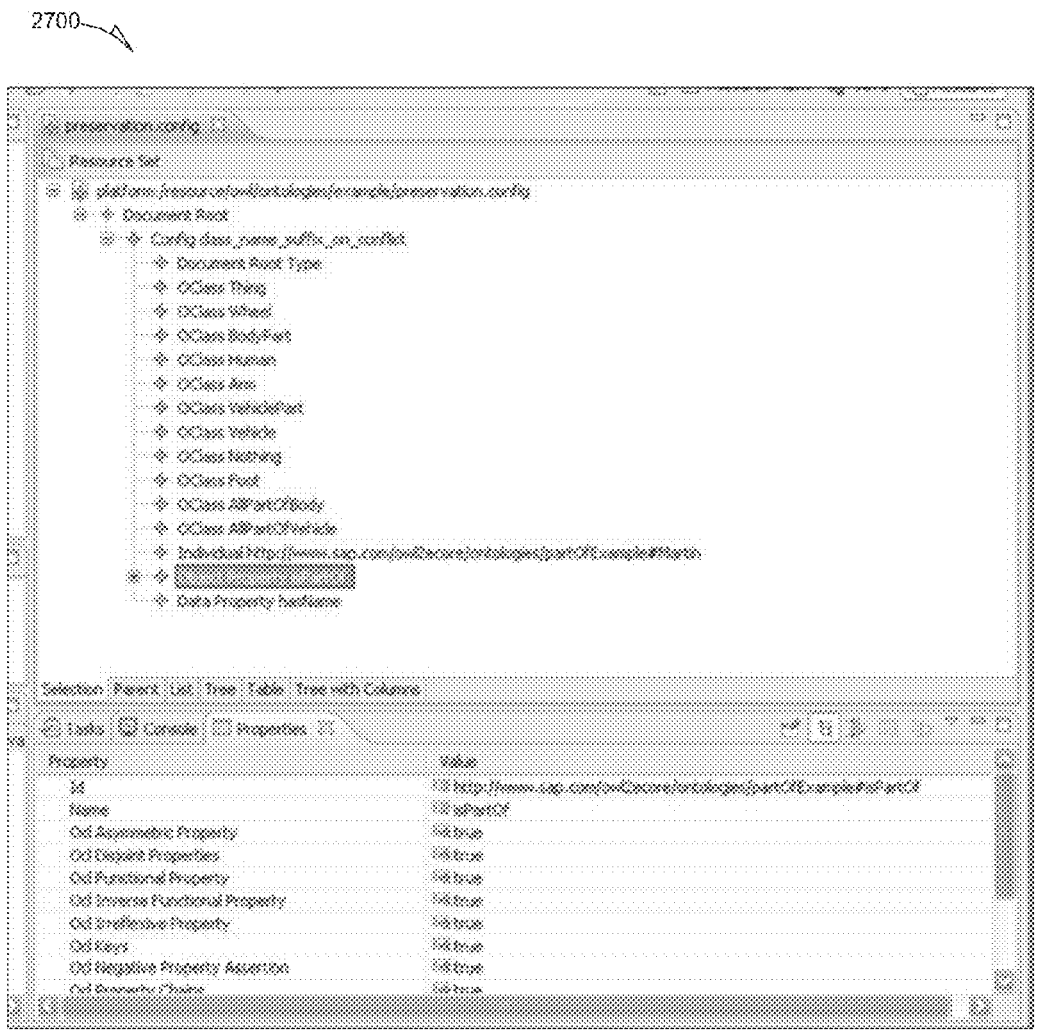
FIG. 27 illustrates a configuration file editor, in accordance with an example embodiment.

To modify transformation options, the plug-in may contain a hierarchical configuration file editor. FIG. 27 illustrates a configuration file editor 2700, in accordance with an example embodiment. This editor may be an auto generated Eclipse plug-in. Due to the fact that the configuration options may be modeled as an Ecore data model, EMF's code generation facilities may be used to generate the configuration file editor.

A configuration file may be automatically created when transforming an ontology for the first time. Subsequently, this file can be opened in Eclipse. The file extension ".config" may be registered for the editor, so it will automatically be used to open the file if the file is named accordingly. Otherwise, it can be opened by right-clicking on the configuration file and selecting Open With, then Other . . . , and finally Config Model Editor.

An example of two transformations being performed on the same example ontology, but with distinct objectives, is provided below. The first transformation aims to preserve as much information as possible, while the second transformation aims to obtain a clean and simple software model.

An example ontology in OWL functional syntax is provided as follows:

```
Prefix(owl:=<http://www.w3.org/2002/07/owl#>)
Prefix(:=<http://www.sap.com/owl2ecore/ontologies/partOfExample#>)
Ontology(<http://www.sap.com/owl2ecore/ontologies/partOfExample>
Declaration(Class(:BodyPart))
Declaration(Class(:Arm))
Declaration(Class(:Human))
Declaration(Class(:Vehicle))
Declaration(Class(:VehiclePart))
Declaration(Class(:Foot))
Declaration(Class(:Wheel))
```

-continued

```
SubClassOf(:Arm :BodyPart)
SubClassOf(:Foot :BodyPart)
SubClassOf(:Wheel :VehiclePart)
Declaration(ObjectProperty(:isPartOf))
SubClassOf(:BodyPart ObjectAllValuesFrom(isPartOf :Human))
SubClassOf(:VehiclePart ObjectAllValuesFrom(isPartOf :Vehicle))
ClassAssertion( :Human :Martin )
DataPropertyAssertion( :hasName :Martin "Martin Knauer" )
DataPropertyDomain( :hasName :Human )
)
```

This example ontology may represent a simple taxonomy of vehicle and vehicle parts, as well as humans and body parts. It may contain the declaration of one object property, isPartOf, for which no domain and range are specified, as well as a data property hasName for the domain Human. No cardinality restriction is specified for this data property. The ontology contains one individual (Martin).

Figure 28:
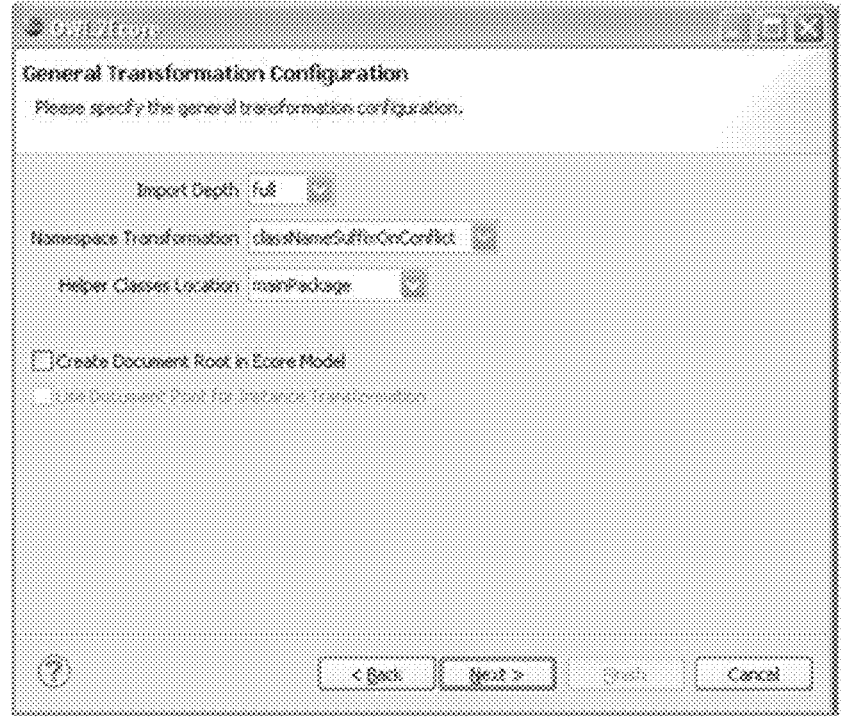
FIG. 28 illustrates a graphical user interface for general transformation configuration, in accordance with an example embodiment

FIG. 28 illustrates a graphical user interface 2800 for general transformation configuration, in accordance with an example embodiment. For both approaches (information preservation vs. model simplicity), the settings shown in FIG. 28 may be used as general configuration options. The settings for Namespace Transformation and Helper Classes Location allow the depiction of the class hierarchy as a whole in one single Ecore diagram. A Document Root is useful when creating new instances using the auto-generated editor, which is not crucial for this example.

Figure 29:
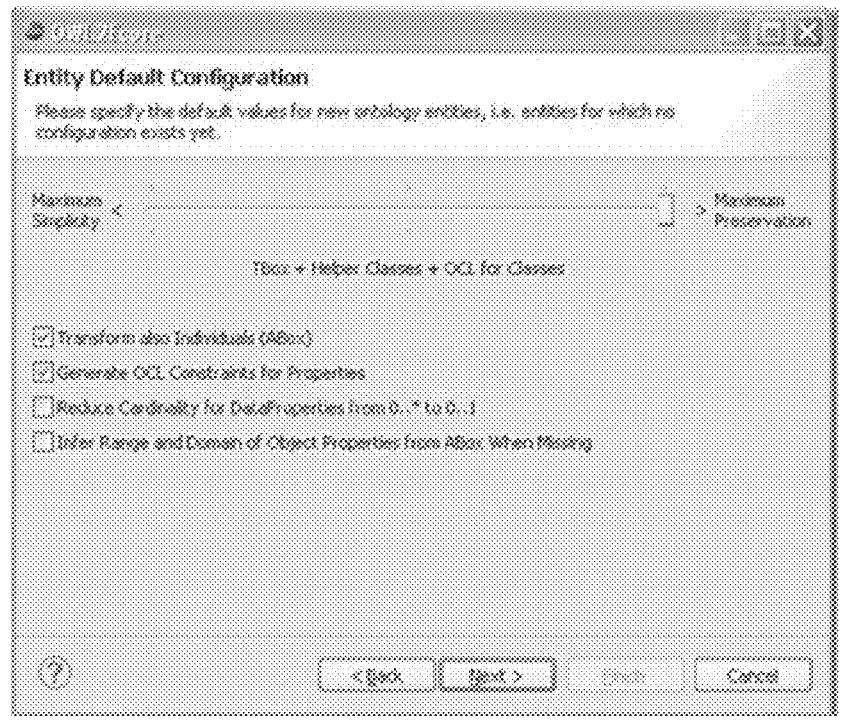
FIG. 29 illustrates a graphical user interface with a configuration for maximum preservation, in accordance with an example embodiment.

FIG. 29 illustrates a graphical user interface 2900 with a configuration for maximum preservation, in accordance with an example embodiment. In order to preserve a maximum of information, the settings shown in FIG. 29 may be chosen. The slider setting specifies that anonymous classes are used in class descriptions are transformed into explicit classes in Ecore and their semantics are preserved by embedding the appropriate OCL validation delegates on these classes.

The user may also want to transform the individuals of the ontology and generate OCL constraints which represent the characteristics of the transformed properties. To be faithful to the ontology, the user may choose neither to reduce the cardinality of data properties, nor to infer domain and range of object properties.

Figure 30:
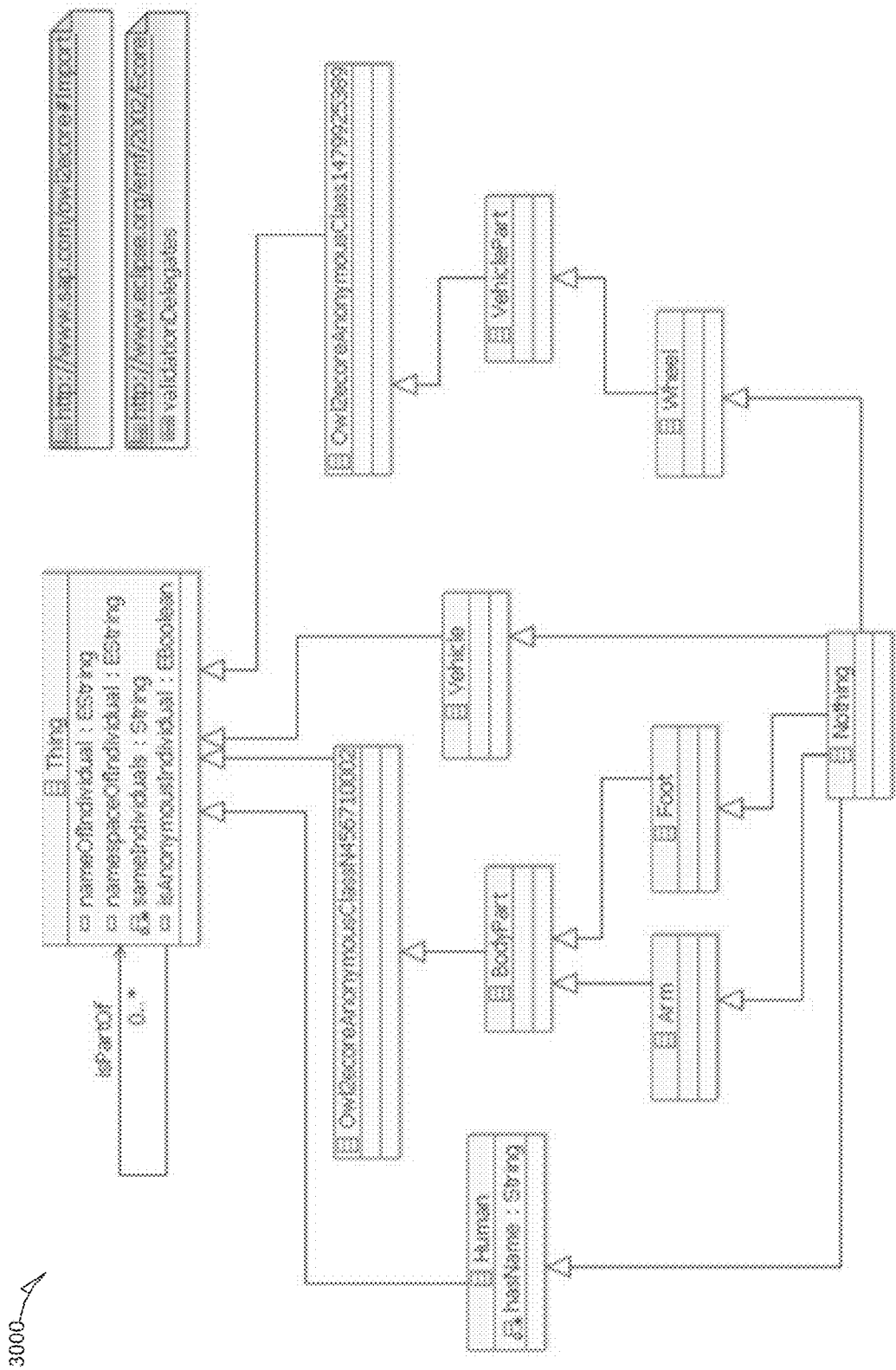
FIG. 30 illustrates an Ecore diagram after a first information preserving transformation, in accordance with an example embodiment.

FIG. 30 illustrates an Ecore diagram 3000 after a first information preserving transformation, in accordance with an example embodiment. The isPartOf property may be attached to Thing. The result of the ABox transformation is not visible in this diagram.

Figure 31:
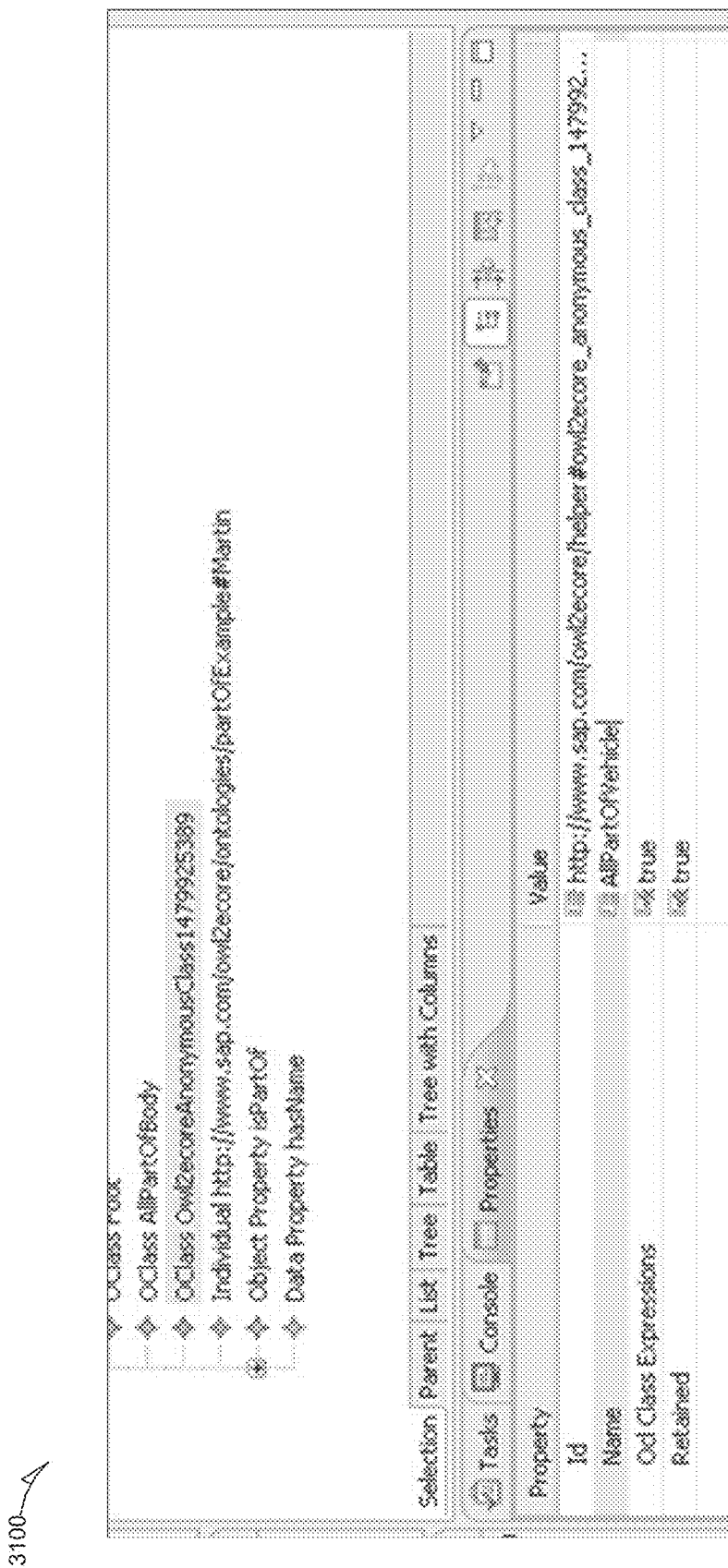
FIG. 31 illustrates a graphical user interface for customizing the name of anonymous classes, in accordance with an example embodiment.
Figure 32:
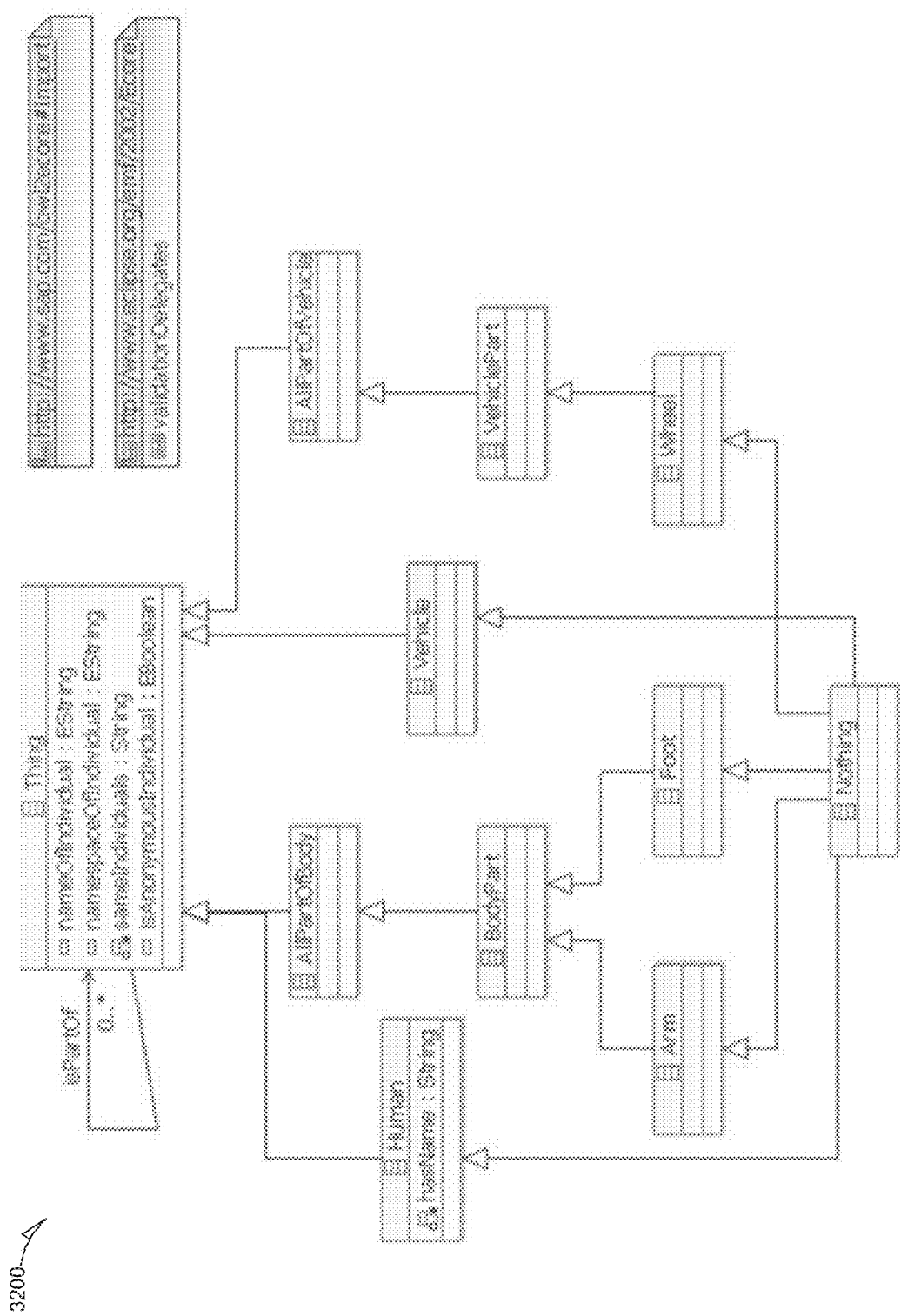
FIG. 32 illustrates an Ecore diagram after customizing class names, in accordance with an example embodiment.

The names of the anonymous classes may be derived from hash values and may not be human-readable. In some embodiments, they may be changed via the auto-generated configuration editor. FIG. 31 illustrates a graphical user interface 3100 for customizing the name of anonymous classes, in accordance with an example embodiment. FIG. 32 illustrates an Ecore diagram 3200 after customizing class names, in accordance with an example embodiment.

Figure 33:
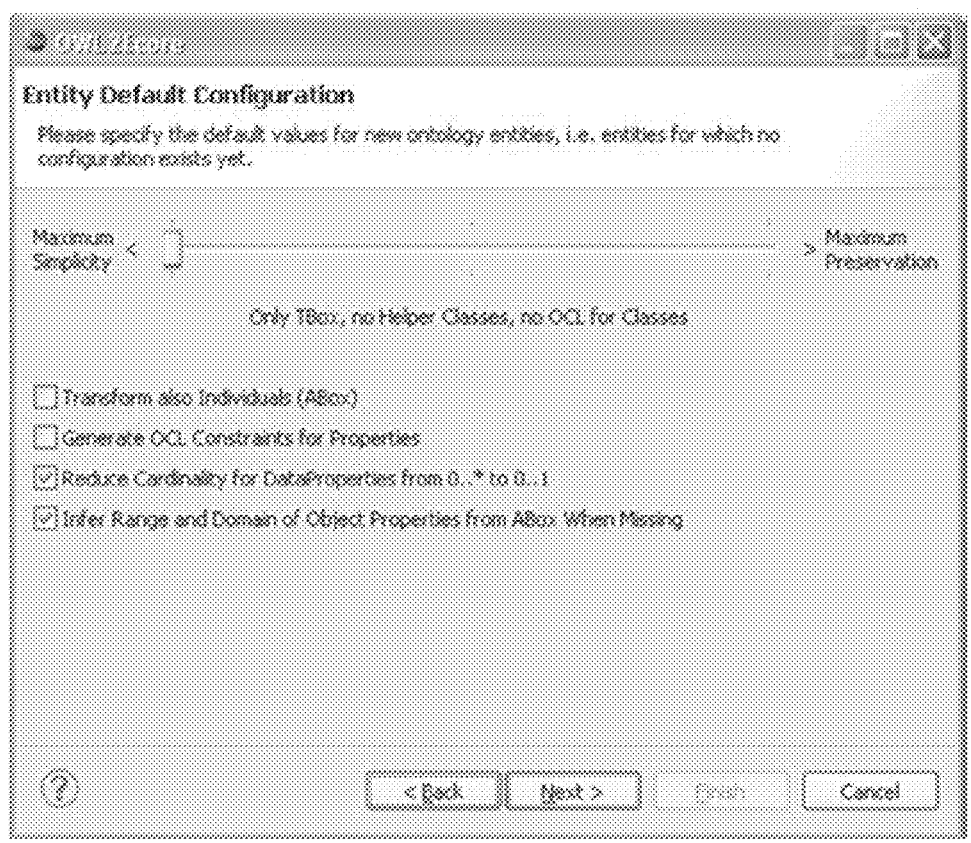
FIG. 33 illustrates a graphical user interface with a configuration for a simple model, in accordance with an example embodiment.

FIG. 33 illustrates a graphical user interface 3300 with a configuration for a simple model, in accordance with an example embodiment. In order to obtain a clean and simple model, the settings shown in FIG. 33 may be chosen. In this case, the user may select to neither transform the anonymous classes nor the ABox. Furthermore, the user may select to not generate OCL constraints representing property characteristics. The user may also choose to reduce the cardinality of data properties. The user may further select to infer domain and range of object properties.

Figure 34:
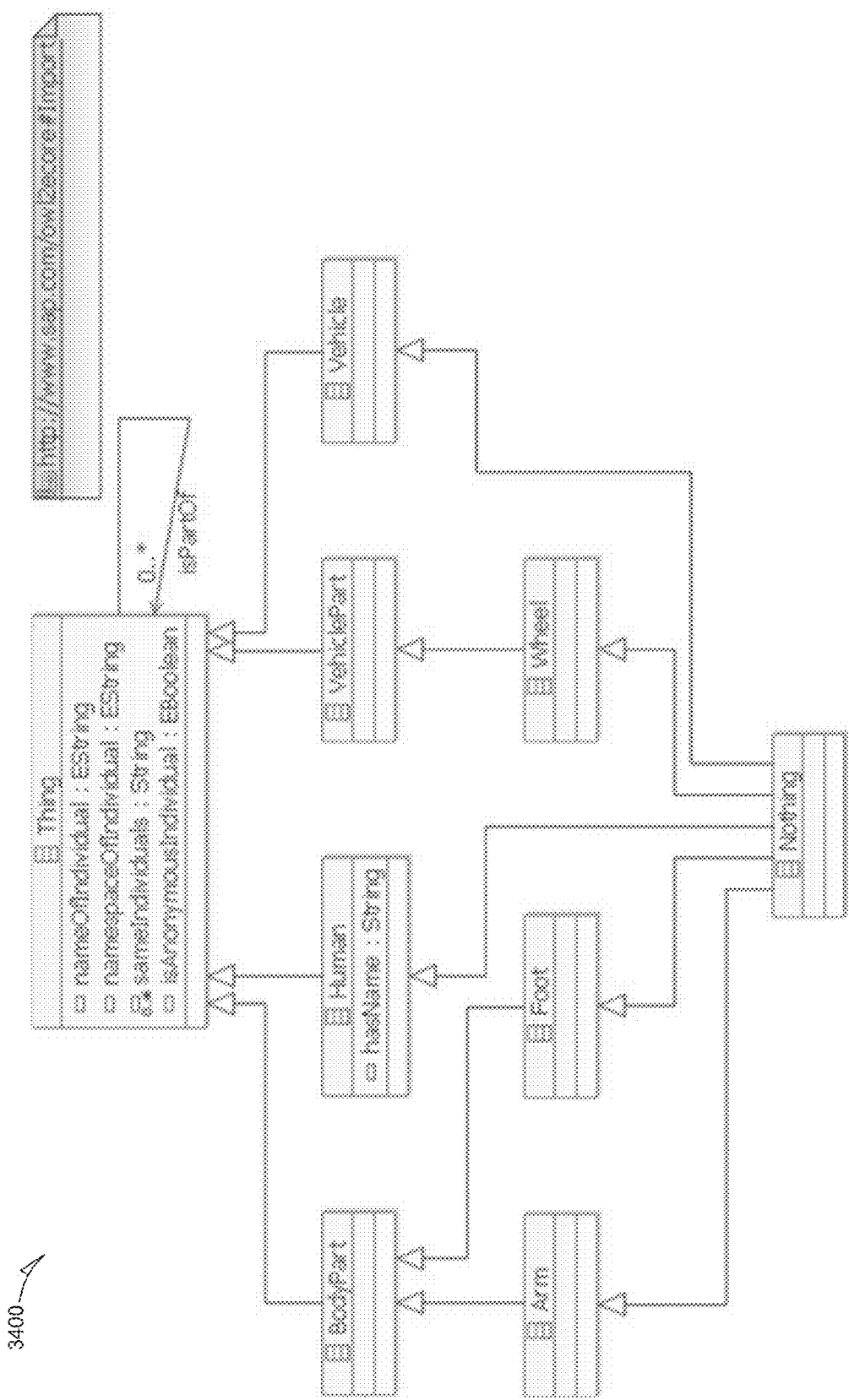
FIG. 34 illustrates an Ecore diagram of a clean and simple software model, in accordance with an example embodiment.
Figure 35:
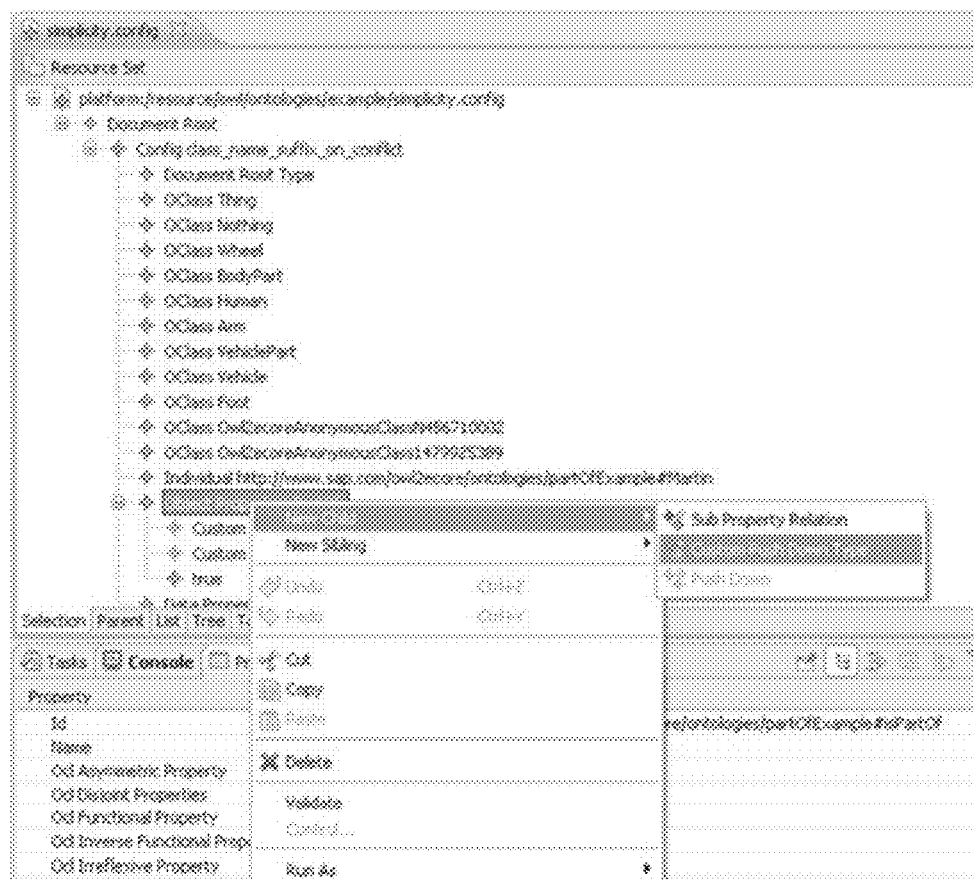
FIG. 35 illustrates a graphical user interface for creating CustomPushDown elements for the isPArtOf property, in accordance with an example embodiment.
Figure 36:
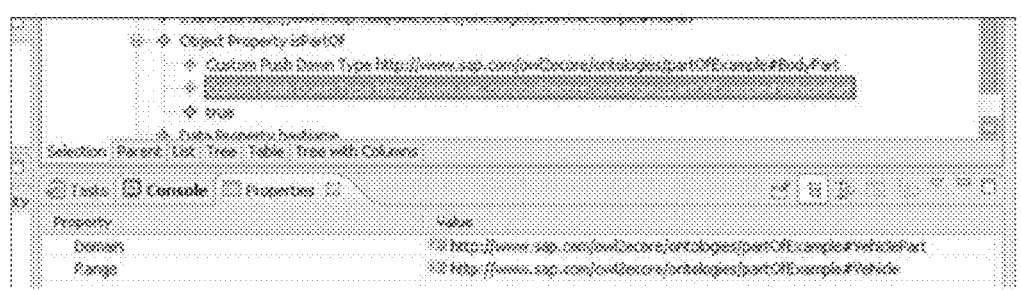
FIG. 36 illustrates a graphical user interface for setting the domain and range values for the CustomPushDown elements, in accordance with an example embodiment.
Figure 37:
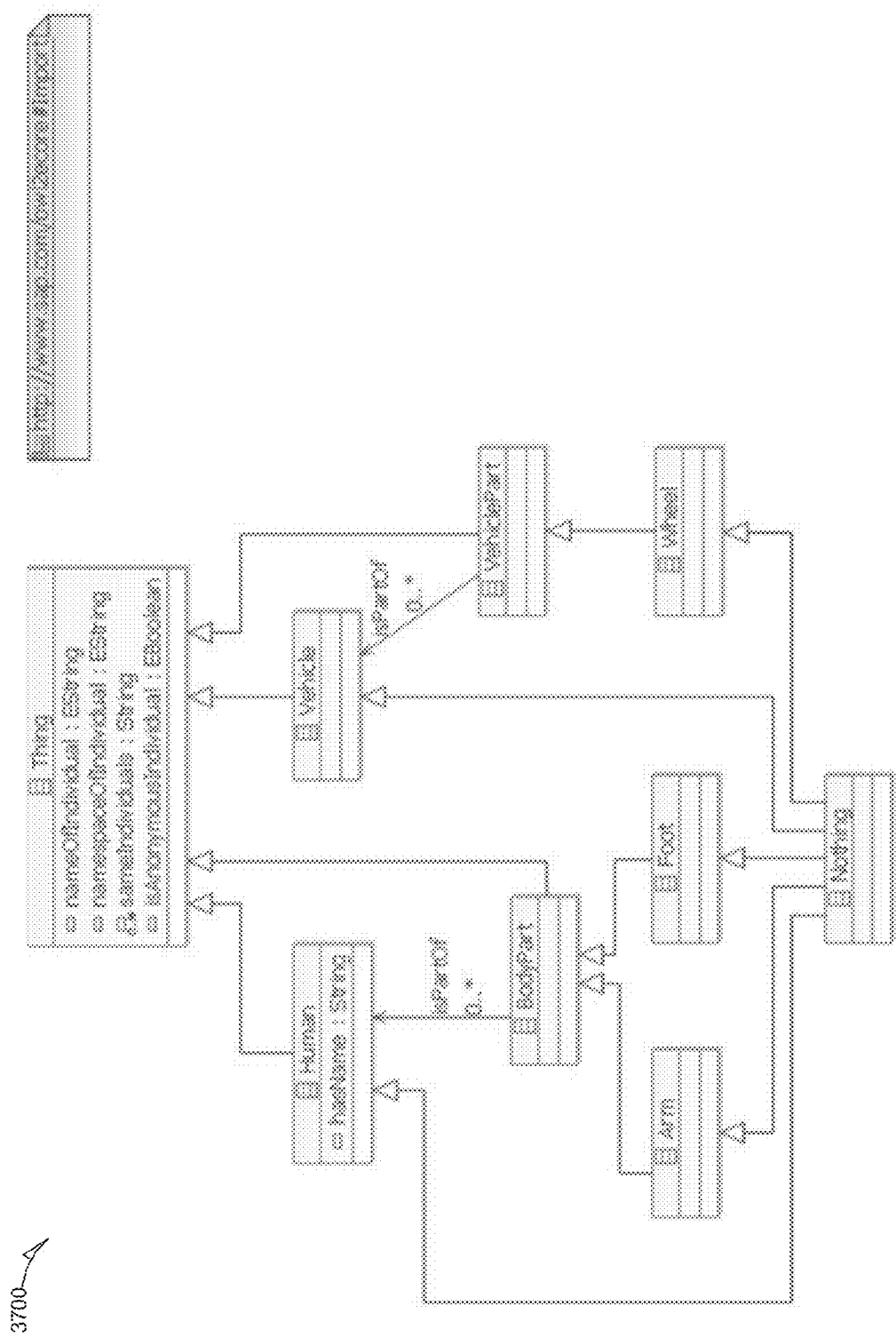
FIG. 37 illustrates an Ecore diagram after pushing down the isPartOf reference, in accordance with an example embodiment.

FIG. 34 illustrates an Ecore diagram 3400 of a clean and simple software model, in accordance with an example embodiment. Again, the user may want to fine-tune the result by pushing down the isPartOf reference from the common supertype to two separate classes. This may be done by using the auto-generated configuration editor. FIG. 35 illustrates a graphical user interface 3500 for creating CustomPushDown elements for the isPArtOf property, in accordance with an example embodiment. FIG. 36 illustrates a graphical user interface 3600 for setting the domain and range values for the CustomPushDown elements, in accordance with an example embodiment. FIG. 37 illustrates an Ecore diagram 3700 after pushing down the isPartOf reference, in accordance with an example embodiment.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 38:
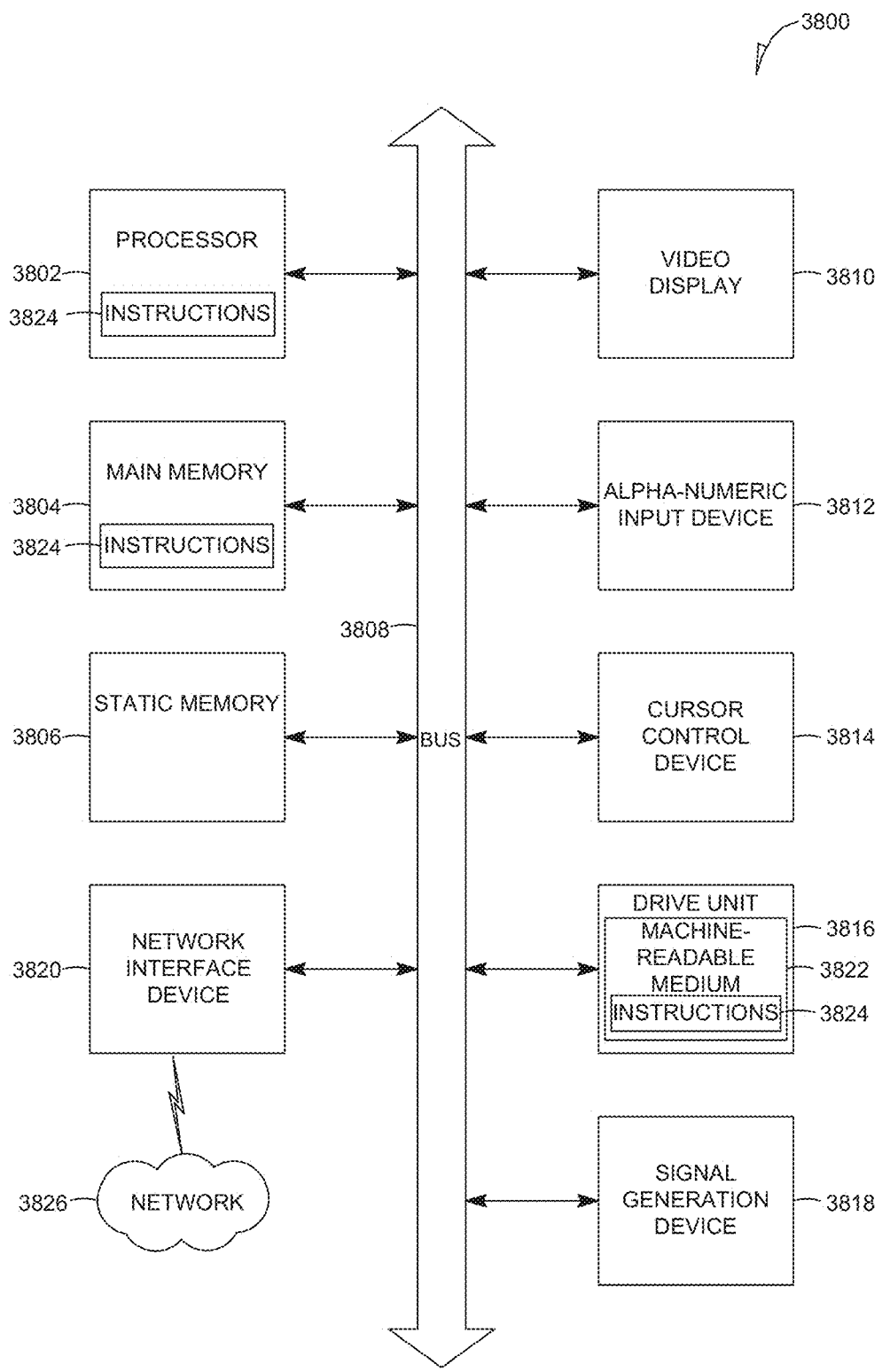
FIG. 38 is a block diagram of an example computer system on which methodologies described herein may be executed, in accordance with an example embodiment.

FIG. 38 is a block diagram of a machine in the example form of a computer system 3800 within which instructions 3824 for causing the machine to perform any one or more of the methodologies discussed herein may be executed, in accordance with an example embodiment. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 3800 includes a processor 3802 (e.g., a central processing unit (CPU), a graphics processing unit (GPU) or both), a main memory 3804 and a static memory 3806, which communicate with each other via a bus 3808. The computer system 3800 may further include a video display unit 3810 (e.g., a liquid crystal display (LCD) or a cathode ray tube (CRT)). The computer system 3800 also includes an alphanumeric input device 3812 (e.g., a keyboard), a user interface (UI) navigation (or cursor control) device 3814 (e.g., a mouse), a disk drive unit 3816, a signal generation device 3818 (e.g., a speaker) and a network interface device 3820.

The disk drive unit 3816 includes a machine-readable medium 3822 on which is stored one or more sets of data structures and instructions 3824 (e.g., software) embodying or utilized by any one or more of the methodologies or functions described herein. The instructions 3824 may also reside, completely or at least partially, within the main memory 3804 and/or within the processor 3802 during execution thereof by the computer system 3800, the main memory 3804 and the processor 3802 also constituting machine-readable media. The instructions 3824 may also reside, completely or at least partially, within the static memory 3806.

While the machine-readable medium 3822 is shown in an example embodiment to be a single medium, the term "machine-readable medium" may include a single medium or multiple media (e.g., a centralized or distributed database, and/or associated caches and servers) that store the one or more instructions 3824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 3824 may further be transmitted or received over a communications network 3826 using a transmission medium. The instructions 3824 may be transmitted using the network interface device 3820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
  enabling a user to adjust configuration settings for a transformation of primitives of a Semantic Web ontology language into primitives of a software modeling language the primitives of the Semantic Web ontology language being part of an ontology;

storing the adjusted configuration settings on a storage device;

performing, by a machine, the transformation of primitives of the Semantic Web ontology language into primitives of the software modeling language using the adjusted configuration settings stored on the storage device, the performing of the transformation comprising:

creating a metamodel;

adding an instance of a metamodel class for a top-level class to the metamodel, the top-level class characterized by having no superclass and being a common superclass for all classes of the ontology;

for each top class of a class hierarchy of the ontology, adding a corresponding instance of the metamodel class to the metamodel, each top class characterized by having no superclass;

associating the top-level class with the instances of the metamodel class corresponding to each top class of the class hierarchy; and for each top class of the class hierarchy of the ontology, adding an annotation comprising a corresponding internationalized resource identifier (IRI) for the top class to the instance of the metamodel class for the top class, adding a corresponding instance of the metamodel class for each subclass of the top class to the metamodel, and associating the top class with the instances of the metamodel class corresponding to each subclass of the top class; and enabling a selection of the adjusted configuration settings stored on the storage device for use in a subsequent transformation of primitives of the Semantic Web ontology language into primitives of the software modeling language.

2. The method of claim 1, wherein performing the transformation comprises generating Object Constraint Language (OCL) constraints for primitives of the software modeling language.

3. The method of claim 1, wherein the semantic web language is Resource Description Framework Schema (RDFS).

4. The method of claim 1, wherein the semantic web language is Web Ontology Language (OWL).

5. The method of claim 1, wherein the software modeling language is Ecore.

6. The method of claim 1, wherein the primitives of the Semantic Web language comprise classes, properties, individuals, and resources.

7. The method of claim 1, further comprising enabling the user or another user to adjust the adjusted configuration settings for use in the subsequent transformation of primitives of the Semantic Web ontology language into primitives of the software modeling language.

8. A system comprising:

a machine having at least one processor; and an ontology transformation module on the machine, the ontology transformation module being configured to:

enable a user to adjust configuration settings for a transformation of primitives of a Semantic Web ontology language into primitives of a software modeling language, the primitives of the Semantic Web ontology language being part of an ontology;

store the adjusted configuration settings on a storage device;

perform the transformation of primitives of the Semantic Web ontology language into primitives of the software modeling language using the adjusted configuration settings stored on the storage device, the performing of the transformation comprising:

creating a metamodel;

adding an instance of a metamodel class for a top-level class to the metamodel, the top-level class characterized by having no superclass and being a common superclass for all classes of the ontology;

for each top class of a class hierarchy of the ontology, adding a corresponding instance of the metamodel class to the metamodel, each top class characterized by having no superclass;

associating the top-level class with the instances of the metamodel class corresponding to each top class of the class hierarchy; and for each top class of the class hierarchy of the ontology, adding an annotation comprising a corresponding internationalized resource identifier (IRI) for the top class to the instance of the metamodel class for the top class, adding a corresponding instance of the metamodel class for each subclass of the top class to the metamodel, and associating the top class with the instances of the metamodel class corresponding to each subclass of the top class; and enable a selection of the adjusted configuration settings stored on the storage device for use in a subsequent transformation of primitives of the Semantic Web ontology language into primitives of the software modeling language.

9. The system of claim 8, wherein the ontology transformation module is further configured to generate Object Constraint Language (OCL) constraints for primitives of the software modeling language.

10. The system of claim 8, wherein the semantic web language is Resource Description Framework Schema (RDFS).

11. The system of claim 8, wherein the semantic web language is Web Ontology Language (OWL).

12. The system of claim 8, wherein the software modeling language is Ecore.

13. The system of claim 8, wherein the primitives of the Semantic Web language comprise classes, properties, individuals, and resources.

14. The system of claim 8, wherein the ontology transformation module is further configured to enable the user or another user to adjust the adjusted configuration settings for use in the subsequent transformation of primitives of the Semantic Web ontology language into primitives of the software modeling language.

15. A non-transitory machine-readable storage device, tangibly embodying a set of instructions that, when executed by at least one processor, causes the at least one processor to perform a set of operations comprising:

enabling a user to adjust configuration settings for a transformation of primitives of a Semantic Web ontology language into primitives of a software modeling language, the primitives of the Semantic Web ontology language being part of an ontology;

storing the adjusted configuration settings on a storage device;

performing the transformation of primitives of the Semantic Web ontology language into primitives of the software modeling language using the adjusted configuration settings stored on the storage device, the performing of the transformation comprising:

creating a metamodel;

adding an instance of a metamodel class for a top-level class to the metamodel, the top-level class characterized by having no superclass and being a common superclass for all classes of the ontology;

for each top class of a class hierarchy of the ontology, adding a corresponding instance of the metamodel class to the metamodel, each top class characterized by having no superclass;

associating the top-level class with the instances of the metamodel class corresponding to each top class of the class hierarchy; and for each top class of the class hierarchy of the ontology, adding an annotation comprising a corresponding internationalized resource identifier (IRI) for the top class to the instance of the metamodel class for the top class, adding a corresponding instance of the metamodel class for each subclass of the top class to the metamodel, and associating the top class with the instances of the metamodel class corresponding to each subclass of the top class; and enabling a selection of the adjusted configuration settings stored on the storage device for use in a subsequent transformation of primitives of the Semantic Web ontology language into primitives of the software modeling language.

16. The device of claim 15, wherein performing the transformation comprises generating Object Constraint Language (OCL) constraints for primitives of the software modeling language.

17. The device of claim 15, wherein the semantic web language is Resource Description Framework Schema (RDFS).

18. The device of claim 15, wherein the semantic web language is Web Ontology Language (OWL).

19. The device of claim 15, wherein the software modeling language is Ecore.

20. The device of claim 15, wherein the set of operations further comprises enabling the user or another user to adjust the adjusted configuration settings for use in the subsequent transformation of primitives of the Semantic Web ontology language into primitives of the software modeling language.

* * * * *